(12) United States Patent
Nehra et al.

(10) Patent No.: US 11,941,280 B2
(45) Date of Patent: Mar. 26, 2024

(54) ON-DEMAND RESTORE OF A SNAPSHOT TO AN ON-DEMAND VOLUME ACCESSIBLE TO CLIENTS

(71) Applicant: NetApp Inc., San Jose, CA (US)

(72) Inventors: Jagavar Nehra, Karnataka (IN); Roopesh Chuggani, Rajasthan (IN); Abhisar, Uttar Pradesh (IN); Sumith Makam, Bangalore (IN)

(73) Assignee: NetApp, Inc., San Jose, CA (US)

( * ) Notice: Subject to any disclaimer, the term of this patent is extended or adjusted under 35 U.S.C. 154(b) by 63 days.

(21) Appl. No.: 17/587,727

(22) Filed: Jan. 28, 2022

(65) Prior Publication Data

US 2023/0029795 A1   Feb. 2, 2023

(30) Foreign Application Priority Data

Jul. 29, 2021 (IN) .............................. 202141034103
Jul. 29, 2021 (IN) .............................. 202141034122

(51) Int. Cl.
*G06F 11/14* (2006.01)
*G06F 3/06* (2006.01)

(52) U.S. Cl.
CPC ............ *G06F 3/065* (2013.01); *G06F 3/0619* (2013.01); *G06F 3/067* (2013.01); *G06F 11/1469* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 8,832,039 B1 | 9/2014 | Sorenson, III et al. | |
| 9,092,375 B1 | 7/2015 | Dalal et al. | |
| 9,361,187 B2* | 6/2016 | Jarvis | G06F 11/1458 |
| 9,760,448 B1 | 9/2017 | Per et al. | |
| 11,144,502 B2 | 10/2021 | George et al. | |
| 11,366,682 B1 | 6/2022 | Krasilnikov et al. | |
| 11,625,306 B2 | 4/2023 | Yelheri et al. | |
| 11,720,525 B2 | 8/2023 | Pandit et al. | |
| 2007/0245104 A1 | 10/2007 | Lindemann et al. | |
| 2015/0370644 A1 | 12/2015 | Graefe et al. | |
| 2017/0147441 A1* | 5/2017 | Binford | G06F 11/1435 |
| 2022/0083432 A1* | 3/2022 | Mondal | G06F 11/1453 |
| 2022/0138151 A1 | 5/2022 | Yelheri et al. | |
| 2022/0138152 A1 | 5/2022 | Yelheri et al. | |
| 2022/0138153 A1 | 5/2022 | Yelheri et al. | |
| 2022/0138169 A1 | 5/2022 | Yelheri et al. | |
| 2022/0138207 A1 | 5/2022 | Yelheri et al. | |
| 2023/0032522 A1 | 2/2023 | Nehra et al. | |

* cited by examiner

*Primary Examiner* — Eddy Cheung
(74) *Attorney, Agent, or Firm* — Cooper Legal Group, LLC

(57) ABSTRACT

Techniques are provided for caching data during an on-demand restore using a cloud block map. A client may be provided with access to an on-demand volume during a restore process that copies backup data from a snapshot within a remote object store to the on-demand volume stored within local storage. In response to receiving a request from the client for a block of the backup data not yet restored from the snapshot to the on-demand volume, the block may be retrieved from the snapshot in the remote object store. The block may be cached within a cloud block map stored within the local storage as a cached block. The client may be provided with access to the cached block.

20 Claims, 19 Drawing Sheets

ON-DEMAND RESTORE OF A SNAPSHOT TO AN ON-DEMAND VOLUME ACCESSIBLE TO CLIENTS

RELATED APPLICATIONS

This application claims priority to India Patent Application, titled "CLOUD BLOCK MAP FOR CACHING DATA DURING ON-DEMAND RESTORE", filed on Jul. 29, 2021 and accorded Indian Application No.: 202141034103 and claims priority to India Patent Application, titled "ON-DEMAND RESTORE OF A SNAPSHOT TO AN ON-DEMAND VOLUME ACCESSIBLE TO CLIENTS", filed on Jul. 29, 2021 and accorded Indian Application No.: 202141034122, which are incorporated herein by reference.

BACKGROUND

A device such as a node may store data on behalf of a client within a volume. The volume may be stored within local storage accessible to the device, such as within on-premise storage. The device may implement storage management functions for the client. For example, the device may create backups of the volume by creating snapshots of the volume. A snapshot of the volume may capture a point-in-time representation of a state of the volume. The device may use the snapshot in order to restore the volume back to a state of the volume at which the snapshot was created.

DETAILED DESCRIPTION

Figure 1:
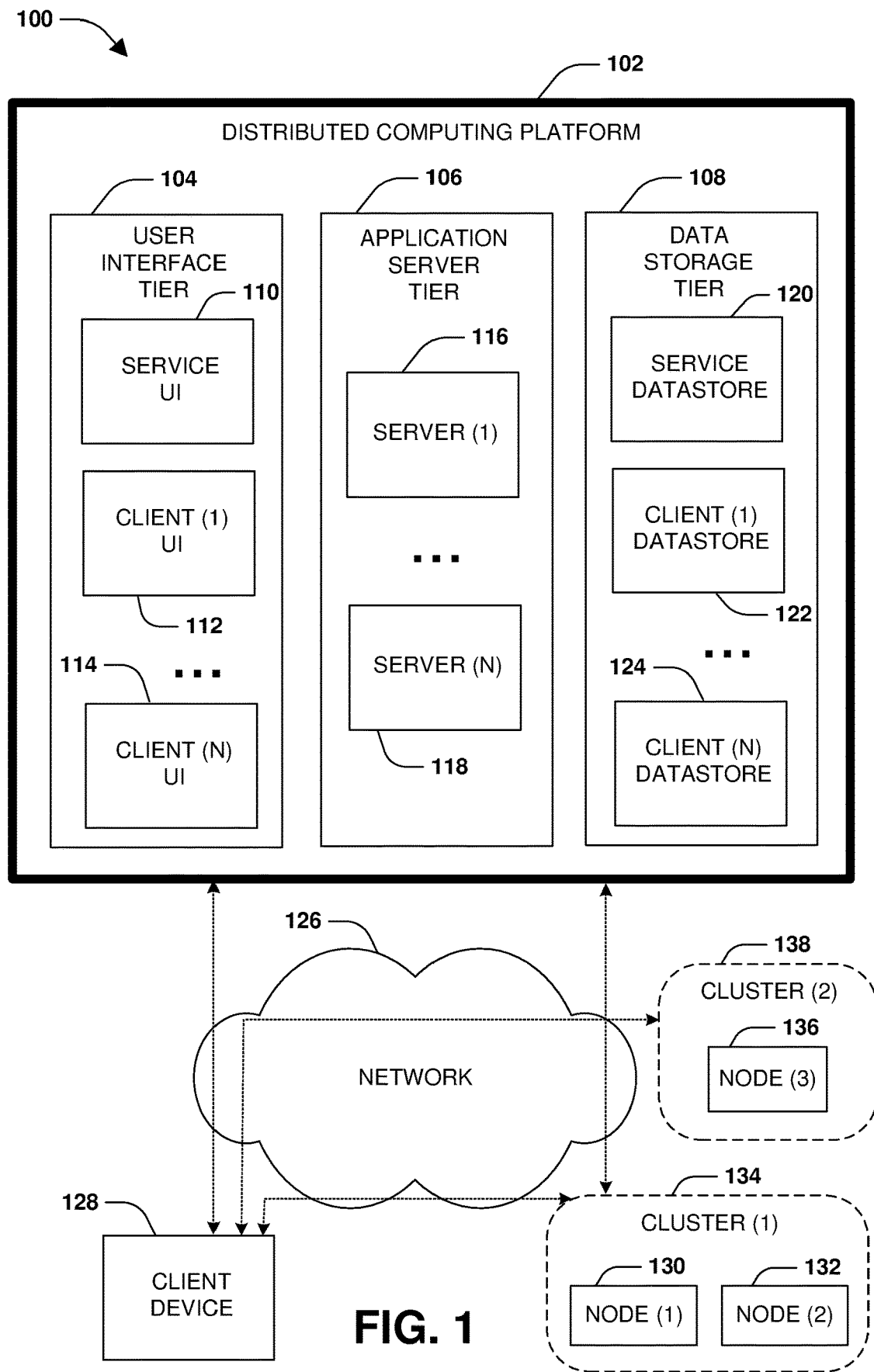
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A client may store data within a volume that is managed by a node. The volume may be stored within local storage, such as on-premise storage, that is accessible to the node. The node may provide the client with backup functionality in order to back up the volume, restore functionality in order to restore the volume back to a prior state, and/or other storage functionality. For example, the node may create snapshots of the volume as point-in-time representations of the volume. A snapshot may be used to restore the volume back to a prior state of the volume captured by the snapshot. Because a large number of snapshots may be created over time, the snapshots may consume a substantial amount of costly local storage. Accordingly, the node may store the snapshots through a remote object store, such as a cloud storage environment, within relatively cheaper storage compared to the local storage. In an example, backup data of the snapshots may be stored as objects within the remote object store. The remote object store may provide relatively low cost storage that is highly scalable for long term storage of snapshots.

When a client requests to restore the volume using one of the snapshots stored within the remote object store, a restore process is initiated. Depending on the amount of backup data that is to be retrieved over a network from the remote object store, the restore process could take several hours. Unfortunately, the data being restored is unavailable to the client until the entire restore process is complete. That is, until the restore process fully completes, the client is unable to access already restored data and is unable to access data yet to be restored. This can result in the client being unable to access data for hours. Any applications that will use this data are unable to run until the restore process is fully complete, which can result in hours of application downtime and/or can cause applications to timeout.

An on-demand restore process is implemented to restore backup data of a snapshot to an on-demand volume. The on-demand restore process may be implemented by a device such as a node, a virtual machine, a container (e.g., a Kubernete container), through a Quark pod, a cloud computing environment, a server, an on-premise device, software, hardware, or a combination thereof. The on-demand restore process is implemented such that the client is provided with access to the on-demand volume before the on-demand restore process has completed. During the on-demand restore process where backup data of the snapshot is retrieved from the remote object store and is restored to the on-demand volume, the client is provided with access to already restored backup data and backup data not yet restored by the on-demand restore process.

In some embodiments of implementing the on-demand restore process, metadata of the snapshot is retrieved from the remote object store and stored within the local storage. Once the metadata has been retrieved from the remote object store and stored within the local storage, the client may be provided with access to the on-demand volume while the on-demand restore process is restoring backup data from the snapshot to the on-demand volume within the local storage. When the client requests access to a block of the backup data during the on-demand restore process, the metadata can be used to determine whether the block has already been restored to the on-demand volume or has yet to be restored to the on-demand volume. If the block has already been restored to the on-demand volume, then the client is provided with access to the block stored within the local storage. Because the block is not retrieved over the network from the remote object store, the client is provided with low latency access to the block stored within the local storage. If the block has not yet been restored to the on-demand volume, then the block is retrieved over the network from the snapshot within the remote object store, and is provided to the client. In this way, the client may access already restored data and not yet restored data during the on-demand restore process.

A cloud block map may be used to provide the client with access to backup data of a file being restored in a manner that does not affect the integrity of the file. When a determination is made that the client is requesting access to a block of backup data not yet restored by the restore process, the block may be retrieved from the snapshot in the remote object store. The block is cached as a cached block within the cloud block map stored within the local storage of the device. In this way, the client is provided with access to the cached block within the cloud block map. Any modifications to the cached block within the cloud block map does not affect or modify the file being restored by the restore process. This preserves the integrity of the file that is being restored to the state captured in the snapshot, which would not be the case if the file was overwritten by the subsequent modifications by the client. The client may subsequently access the cached block of backup data within the cloud block map stored in the local storage at a lower latency than if the subsequent access had to re-retrieve the backup data over the network from the remote object store. In this way, blocks of not yet restored backup data are cached within the cloud block map in order to reduce latency experienced by the client when accessing the backup data not yet restored by the restore process. This is achieved because the cloud block map is stored within the local storage that provides lower latency than accessing the backup data over the network from the remote object store.

The cloud block map may be managed in an efficient manner so that the cloud block map does not grow indefinitely or consume more storage space than necessary. In particular, temperature metrics are tracked for cached blocks within the cloud block map. A temperature metric for a cached block is derived from a last time that the cached block was accessed. Thus, the temperature metric is indicative of how recently and/or frequently the cached block was accessed. An eviction scanner may be executed to evaluate the temperature metrics of the cached blocks to determine whether to evict or retain the cached blocks within the cloud block map. In response to the eviction scanner determining that the temperature metric is above a threshold (e.g., the cached block was recently accessed), the cached block may be retained in the cloud block map. In response to the eviction scanner determining that the temperature metric is below a threshold (e.g., the cached block has not been recently accessed), the cached block may be evicted from the cloud block map.

Various embodiments of the present technology provide for a wide range of technical effects, advantages, and/or improvements to computing systems and components. For example, various embodiments may include one or more of the following technical effects, advantages, and/or improvements: 1) backing up snapshots of a volume within local storage to a remote object store that provides low cost long term scalable storage 2) restoring a snapshot from the remote object store on-demand to an on-demand volume within local storage that provides the client with low latency access to data within the on-demand volume, 3) providing a client with access to the on-demand volume during the restore operation while backup data is being restored from the snapshot to the on-demand volume so that the client does not have to wait for the entire restore operation to fully complete before being able to access backup data, which can take hours or longer, 4) providing, during the restore process, the client with low latency access to already restored data in the local storage, 5) providing, during the restore process, the client with access to not yet restored data from the snapshot in the remote object store, 6) caching not yet restored blocks within a cloud block map stored within local storage that provides clients with low latency access to the cached blocks, 7) a temperature tracking technique for identifying cached blocks that have not been recently access, and 8) an eviction scanner for evicting the cached blocks that have not been recently accessed in order to reduce storage consumed by the cloud block map.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node

136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
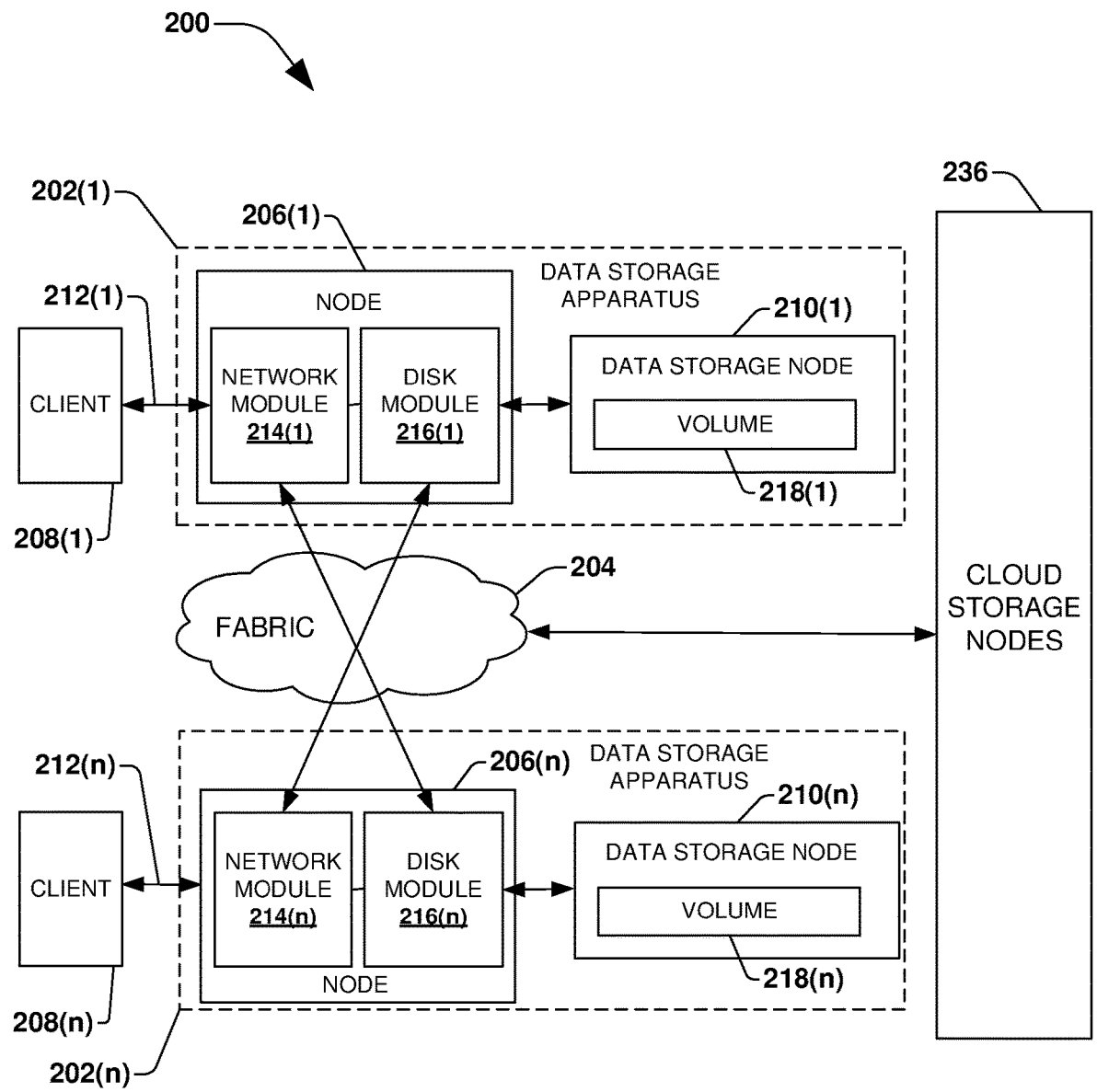
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-

210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
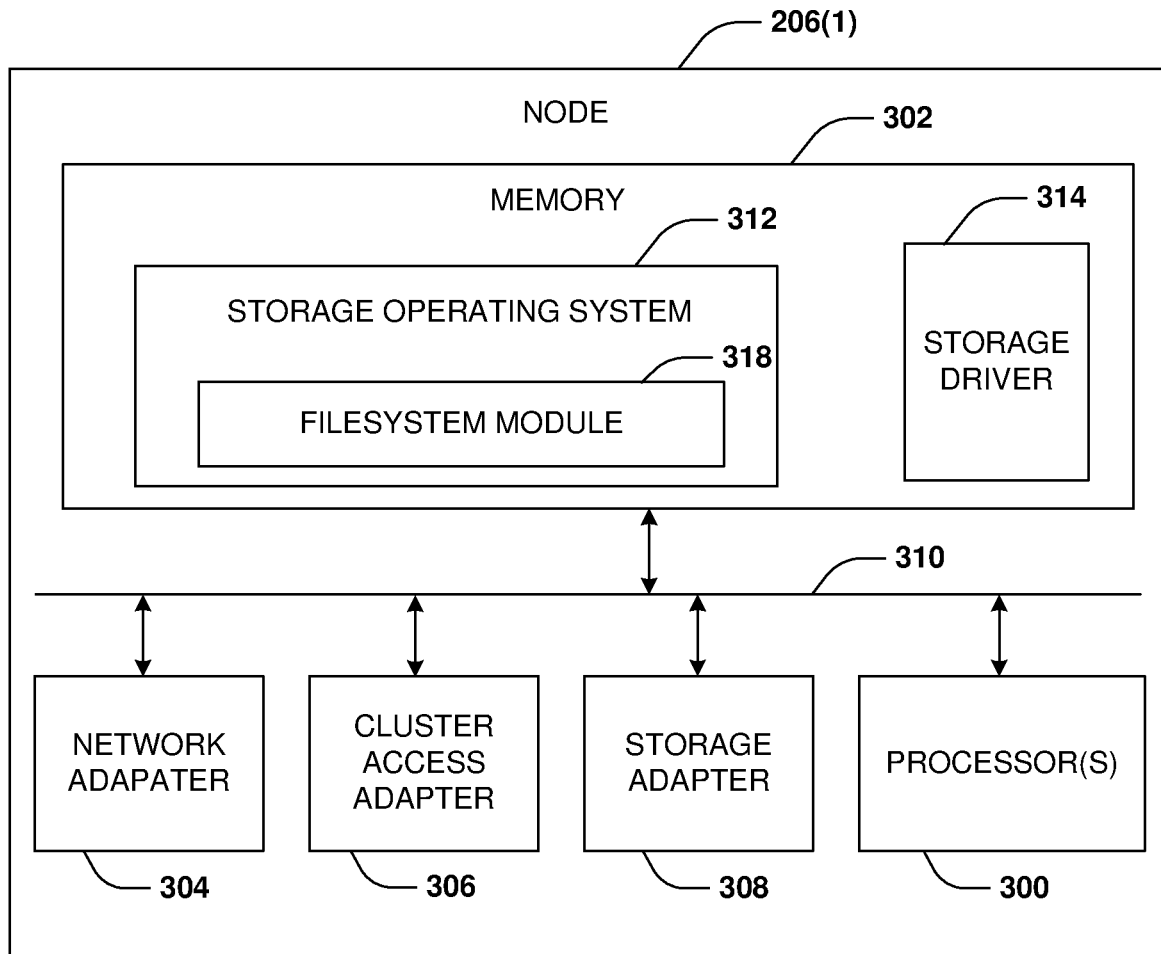
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(n) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, including for example atomic writes for persistent memory as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4A:
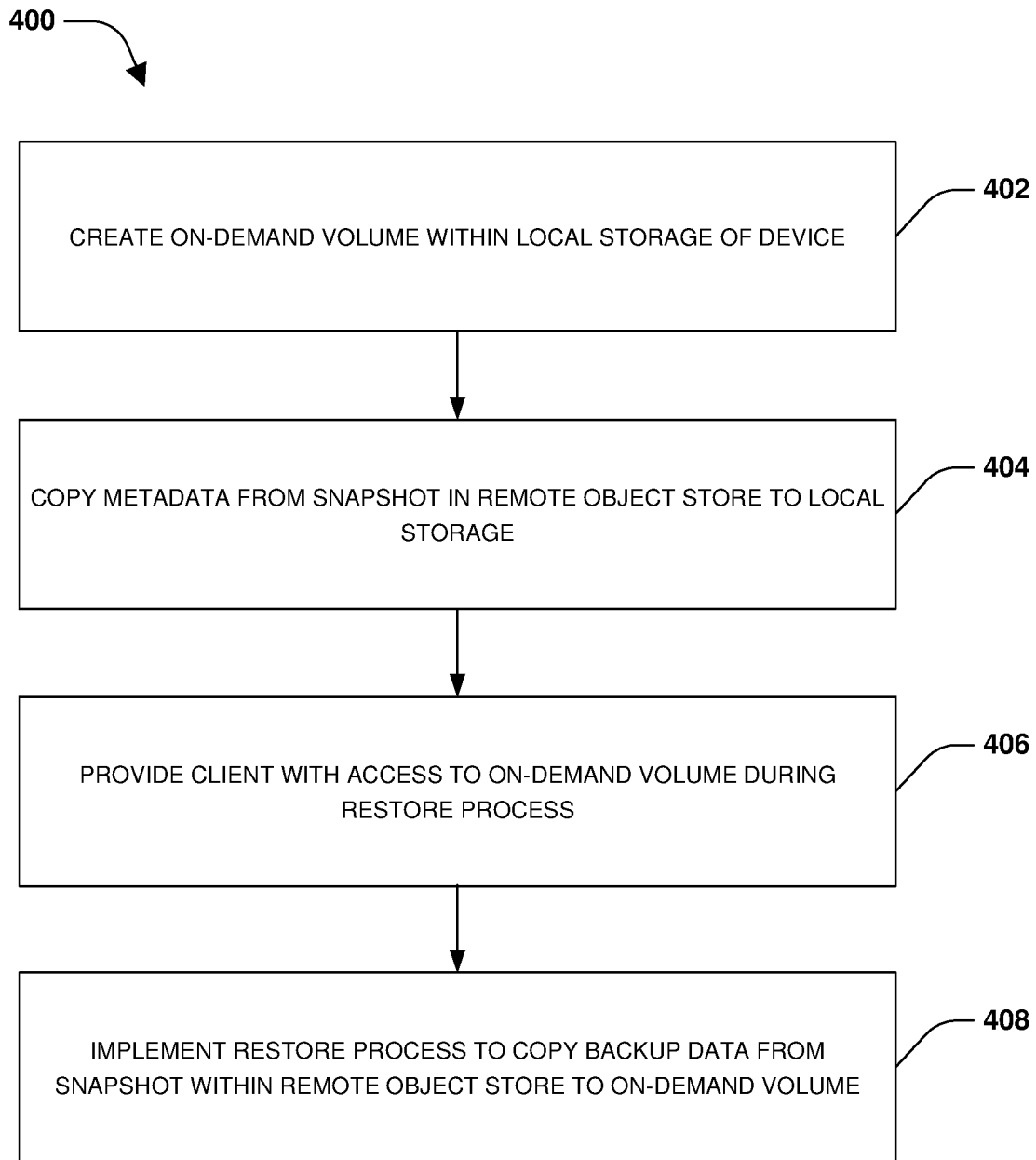
FIG. 4A is a flow chart illustrating an example method for on-demand restore of a snapshot to an on-demand volume accessible to clients.
Figure 5A:
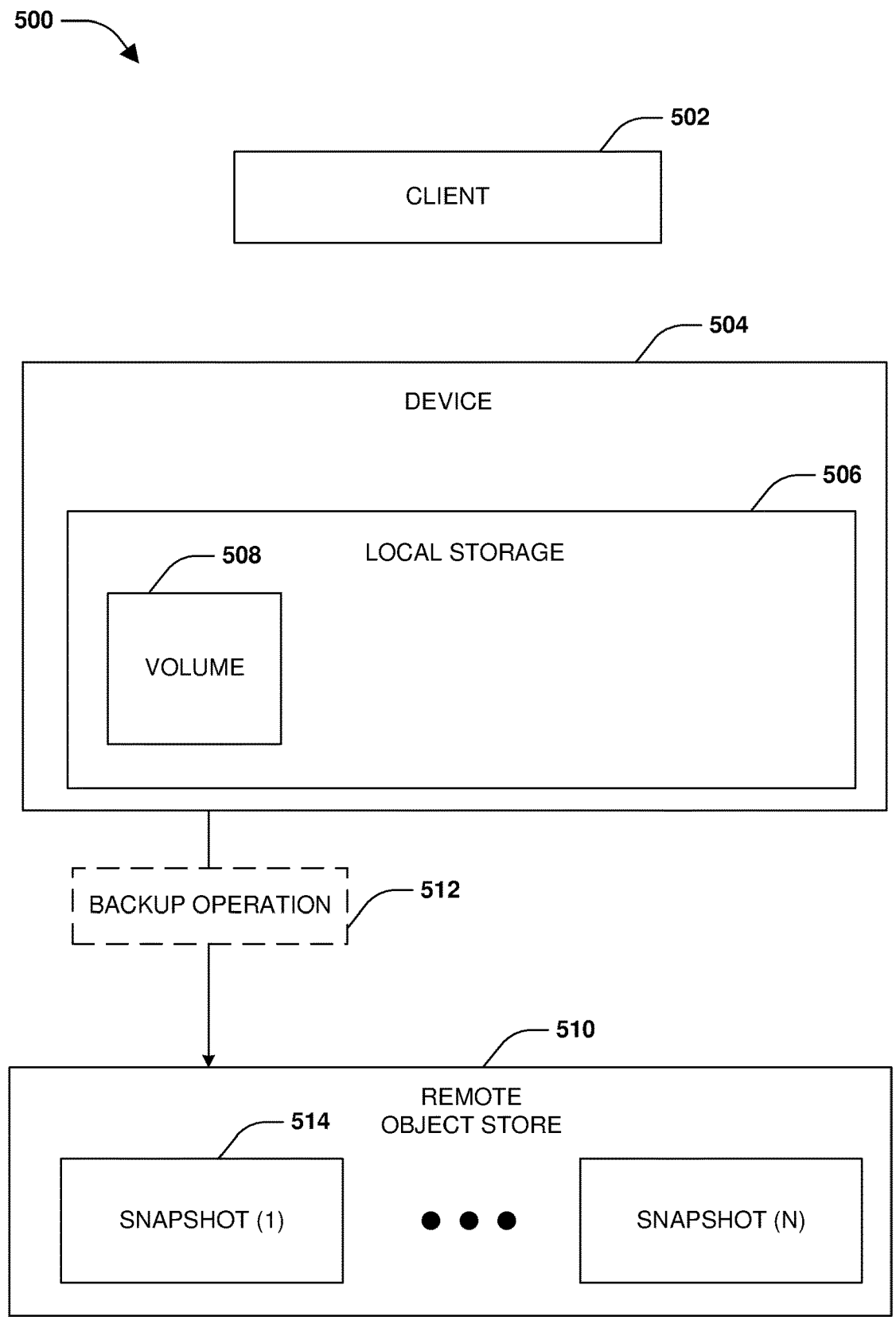
FIG. 5A is a block diagram illustrating an example system for on-demand restore of a snapshot to an on-demand volume accessible to clients, where a backup operation is performed.

One embodiment of on-demand restore of a snapshot to an on-demand volume accessible to clients is illustrated by an exemplary method 400 of FIG. 4A, which is further described in conjunction with system 500 of FIGS. 5A-5E. A device 504 may store data on behalf of a client 502 within local storage 506, as illustrated by FIG. 5A. It may be appreciated that the device 504, configured to perform the on-demand restore, may be implemented as a node, a virtual machine, a container (e.g., a Kubernete container), through a Quark pod, a cloud computing environment, a server, an on-premise device, software, hardware, or a combination thereof. In an example, the device 504 may provide the client 502 with access to a volume 508 stored within the local storage 506. The device 504 may provide storage management functionality that can be used to provide backup, restore, and/or other storage functions. In an example, the device 504 may execute snapshot functionality in order to create snapshots of the volume 508 as point-in-time representations of the volume 508.

Storing the snapshots within the local storage 506 may become expensive over time. Accordingly, the device 504 may implement a backup operation 512 to store the snapshots within a remote object store 510, such as a cloud computing environment, that provides relatively lower cost scalable long term storage compared to the local storage 506. For example, the backup operation 512 may be implemented to transmit a first snapshot 514 of the volume 508 from the device 504 over a network to the remote object store 510. In some embodiments, the backup operation 512 may be implemented to create a snapshot, and then transmit the snapshot from the local storage 506 to storage of the remote object store 510. In some embodiments, the backup operation 512 may be implemented to transfer an existing snapshot from the local storage 506 of the device 504 to the remote object store 510. In this way, any number of snapshots may be stored within the remote object store 510, such as within objects according to an object format.

Figure 5B:
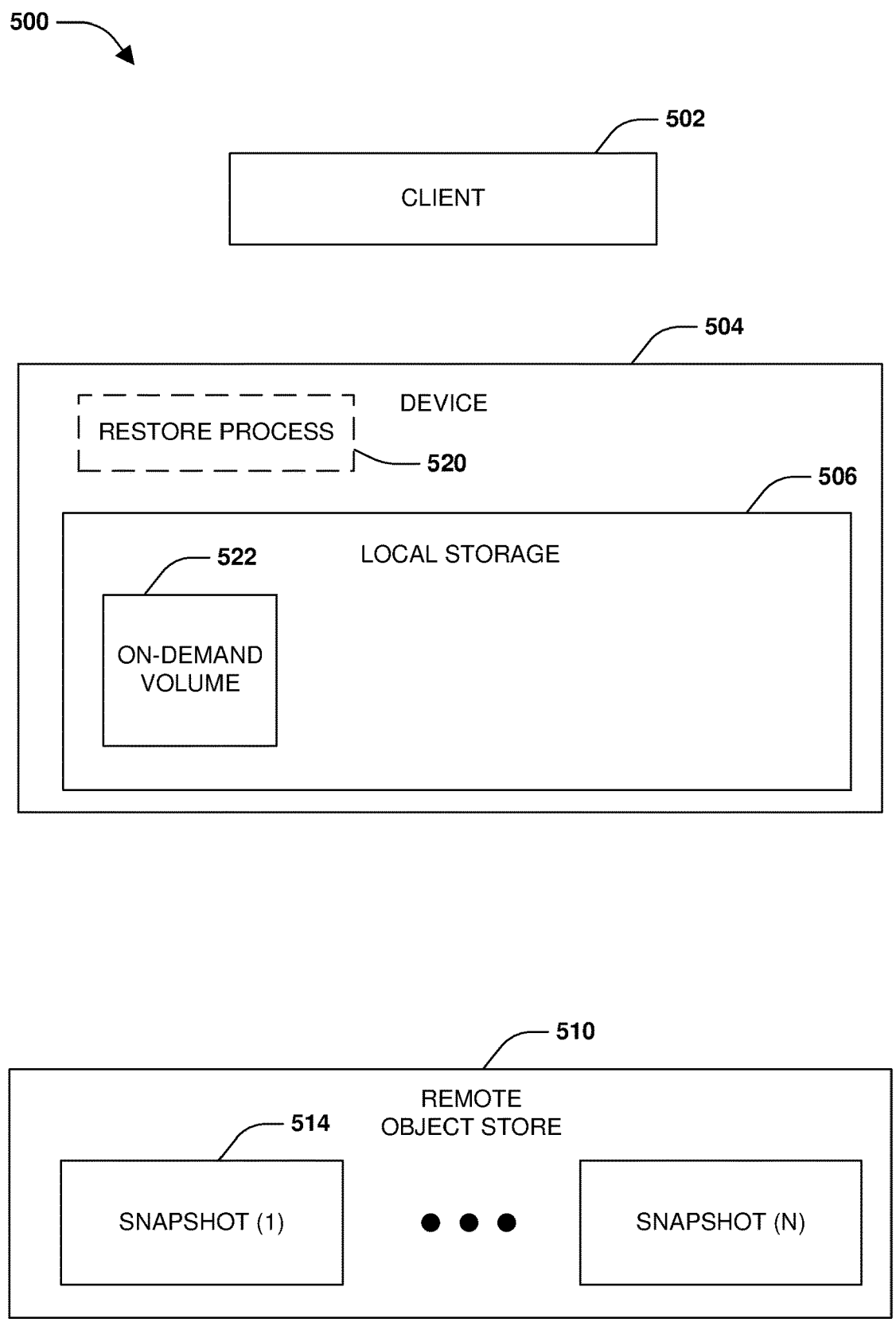
FIG. 5B is a block diagram illustrating an example system for on-demand restore of a snapshot to an on-demand volume accessible to clients, where a restore process is initiated.

The device 504 may receive a restore request to restore the volume 508 back to a state captured by a snapshot such as the first snapshot 514. In an example, the device 504 may receive the request from the client 502. The request may specify the first snapshot 514 that is to be used to perform a restore process 520 (an on-demand restore operation) to restore the volume 508 back to the prior state captured by the first snapshot 514. During operation 402 of method 400 of FIG. 4A, in response to receiving the restore request to restore backup data within the first snapshot 514 stored within the remote object store 510, an on-demand volume 522 is created within the local storage 506 of the device 504, as illustrated by FIG. 5B. The on-demand volume 522 may initially be an empty volume into which the restore process 520 (the on-demand restore operation) will restore the backup data from the first snapshot 514 within the remote object store 510. Unlike a traditional volume where all client requests for data are processed through a file system of the traditional volume using data stored within the traditional volume, client access to the on-demand volume 522 can result in either retrieving already restored data from the on-demand volume 522 or an on-demand retrieval of not yet restored data from the first snapshot 514 within the remote object store 510.

Figure 5C:
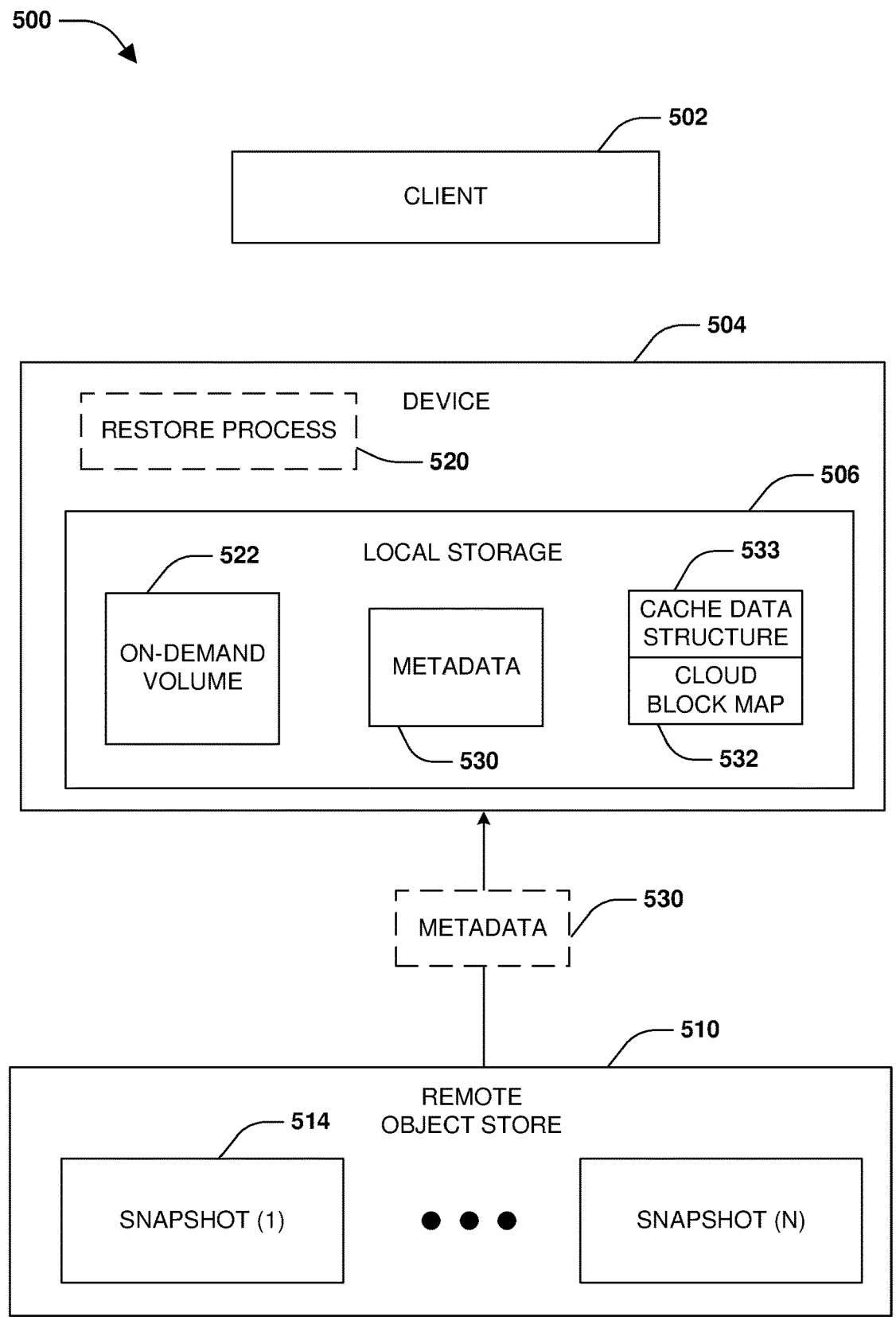
FIG. 5C is a block diagram illustrating an example system for on-demand restore of a snapshot to an on-demand volume accessible to clients, where metadata of a snapshot is copied to local storage.

As part of initializing the restore process 520, metadata 530 of the first snapshot 514 may be retrieved from the remote object store 510, during operation 404 of method 400 of FIG. 4A. The metadata 530 may be stored within the local storage 506 of the device 504, as illustrated by FIG. 5C. The metadata 530 may be retrieved before backup data of the first snapshot 514 is restored from the remote object store 510 to the on-demand volume 522 within the local storage 506 of the device 504.

The metadata 530 may identify blocks comprising the backup data of the first snapshot 514. In an embodiment, the metadata 530 may correspond to a tree structure, such as a buftree, comprising one or more levels of indirect blocks (pointers) that may be traversed from a root of the tree structure down through the tree structure to a bottom level of direct blocks corresponding to actual data. The metadata 530 (e.g., a level of indirect blocks that point to the bottom level of direct blocks) may comprise virtual volume block number entries mapped to physical volume block number entries. For example, a block of backup data within the first snapshot 514 may be associated with a virtual volume block number entry that is mapped to a physical volume block number entry. If the block has not yet been restored from the first snapshot 514 to the on-demand volume 522, then the virtual volume block number entry may be populated with a cloud block number of the block. The cloud block number may correspond to a location of the block stored within the remote object store 510, and thus may be used to locate and retrieve the block from the remote object store 510. Also, if the block has not yet been restored from the first snapshot 514 to the on-demand volume 522, then the physical volume block number entry may be populated with an absent indicator to indicate that backup data of the block has not yet been restored to the on-demand volume 522 and stored within the local storage 506 of the device 504.

If the block has been restored from the first snapshot 514 to the on-demand volume 522, then the virtual volume block number entry may be populated with a virtual volume block number of the block within the on-demand volume 522. Also, if the block has been restored from the first snapshot 514 to the on-demand volume 522, then the physical volume block number entry may be populated with a physical volume block number used to locate a storage location of the block within the local storage 506. In this way, the metadata 530 can be evaluated to determine whether a block has been restored to the on-demand volume 522 by the restore process 520 or has not yet been restored to the on-demand volume 522 by the restore process 520.

Figure 5D:
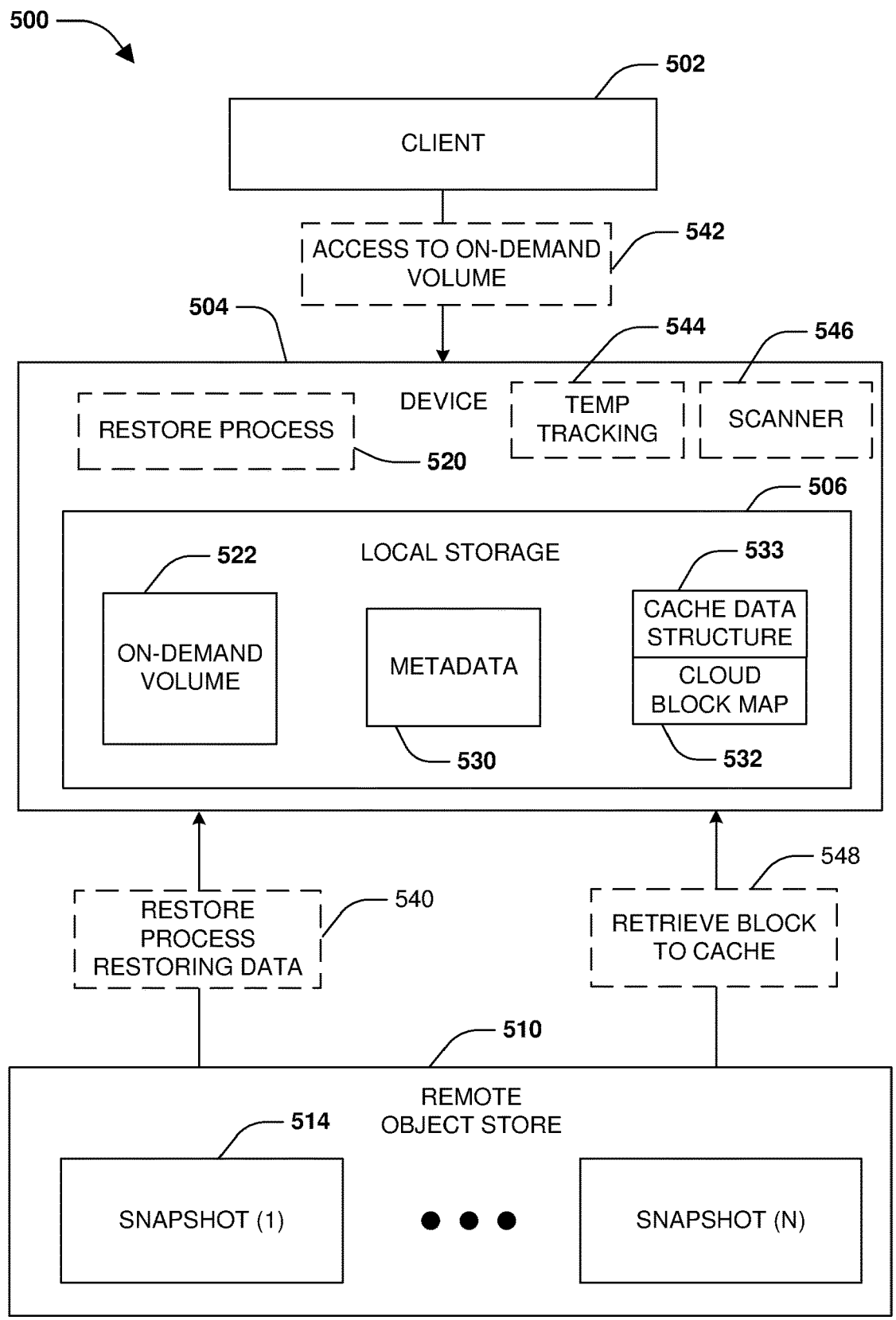
FIG. 5D is a block diagram illustrating an example system for on-demand restore of a snapshot to an on-demand volume accessible to clients, where a client is provided with access to the on-demand volume while a restore process is being executed.

During operation 406 of method 400 of FIG. 4A, the client 502 is provided with access 542 to the on-demand volume 522 during the restore process 520 restoring 540 the backup data from the first snapshot 514 within the remote object store 510 to the on-demand volume 522 for storage within the local storage 506, as illustrated by FIG. 5D. In some embodiments, the client 502 is provided with the access 542 to the on-demand volume 522 during the restore process 520 once the metadata 530 has been copied from the remote object store 510 to the local storage 506. During operation 408 of method 400 of FIG. 4A, the restore process 520 is implemented to restore 540 the backup data from the first snapshot 514 within the remote object store 510 to the on-demand volume 522 for storage within the local storage 506.

In some embodiments of providing the client 502 with the access 542 to the on-demand volume 522 during the restore process 520, a request may be received by the device 504 from the client 502. The request may comprise a read operation, a write operation, or other type of operation. The request may target a particular block of data that has either been restored from the first snapshot 514 within the remote object store 510 to the on-demand volume 522 by the restore process 520 or has yet to be restored from the first snapshot 514 within the remote object store 510 to the on-demand volume 522 by the restore process 520.

In response to receiving the request, the metadata 530 may be evaluated to determine whether the block has been restored from the first snapshot 514 within the remote object store 510 to the on-demand volume 522 by the restore process 520 or has yet to be restored from the first snapshot 514 within the remote object store 510 to the on-demand volume 522 by the restore process 520. For example, the metadata 530 may be traversed (e.g., one or more levels within a buftree of a file comprising data contained with the block) to identify a virtual volume block number entry mapped to a physical volume block number entry for the block.

If the virtual volume block number entry comprises a cloud block number and/or the physical volume block number entry comprises an absent indicator, then the block has not yet been restored from the first snapshot 514 to the on-demand volume 522 by the restore process 520. Accordingly, the block may be retrieved, over a network connection between the device 504 and the remote object store 510, from the first snapshot 514 within the remote object store 510 using the cloud block number, and is provided to the client 502 in response to the request. The block may be retrieved and provided to the client 502 while the restore process 520 is restoring 540 the backup data of the first snapshot 514 within the remote object store 510 to the on-demand volume 522 in the local storage 506. In an embodiment, the block is retrieved and cached as a cached block, within the cloud block map 532 maintained as a cache data structure 533, for access by the client 502. In this way, the client 502 is provided with access to not yet restored data within the first snapshot 514 in the remote object store 510 while the restore process 520 is restoring 540 the backup data of the first snapshot 514 to the on-demand volume 522.

If the virtual volume block number entry comprises a virtual volume block number and/or the physical volume block number entry comprises a physical volume block number, then the block has been restored from the first snapshot 514 within the remote object store 510 to the on-demand volume 522 by the restore process 520 (e.g., as a restored block). Accordingly, the block may be retrieved from the local storage 506 through the on-demand volume 522 using the virtual volume block number and/or the physical volume block number. The block is then provided to the client 502 in response to the request. The block may be retrieved and provided to the client 502 while the restore process 520 is restoring 540 the backup data of the first snapshot 514 within the remote object store 510 to the on-demand volume 522. In this way, the client 502 is provided with access to already restored data through the on-demand volume 522 within the local storage 506 while the restore process 520 is restoring 540 the backup data of the first snapshot 514 within the remote object store 510 to the on-demand volume 522.

In some embodiments, a request may be received from the client 502 through the on-demand volume 522 for data. A set of blocks comprising the data may be identified. In response to the metadata 530 indicating that a first subset of blocks of the set of blocks have not yet been restored to the on-demand volume 522 based upon the metadata 530 comprising absent indicators for the first subset of blocks, the first subset of blocks may be on-demand retrieved from the snapshot and cached for the request. In response to the metadata 530 indicating that a second subset of blocks of the set of blocks have been restored to the on-demand volume 522 based upon the metadata 530 comprising virtual volume block numbers for the second subset of blocks, the second subset of blocks is retrieved from the local storage for the request. In this way, the data, comprised of the first subset of blocks retrieved on-demand and the second subset of blocks already restored, may be provided in response to the request.

Figure 5E:
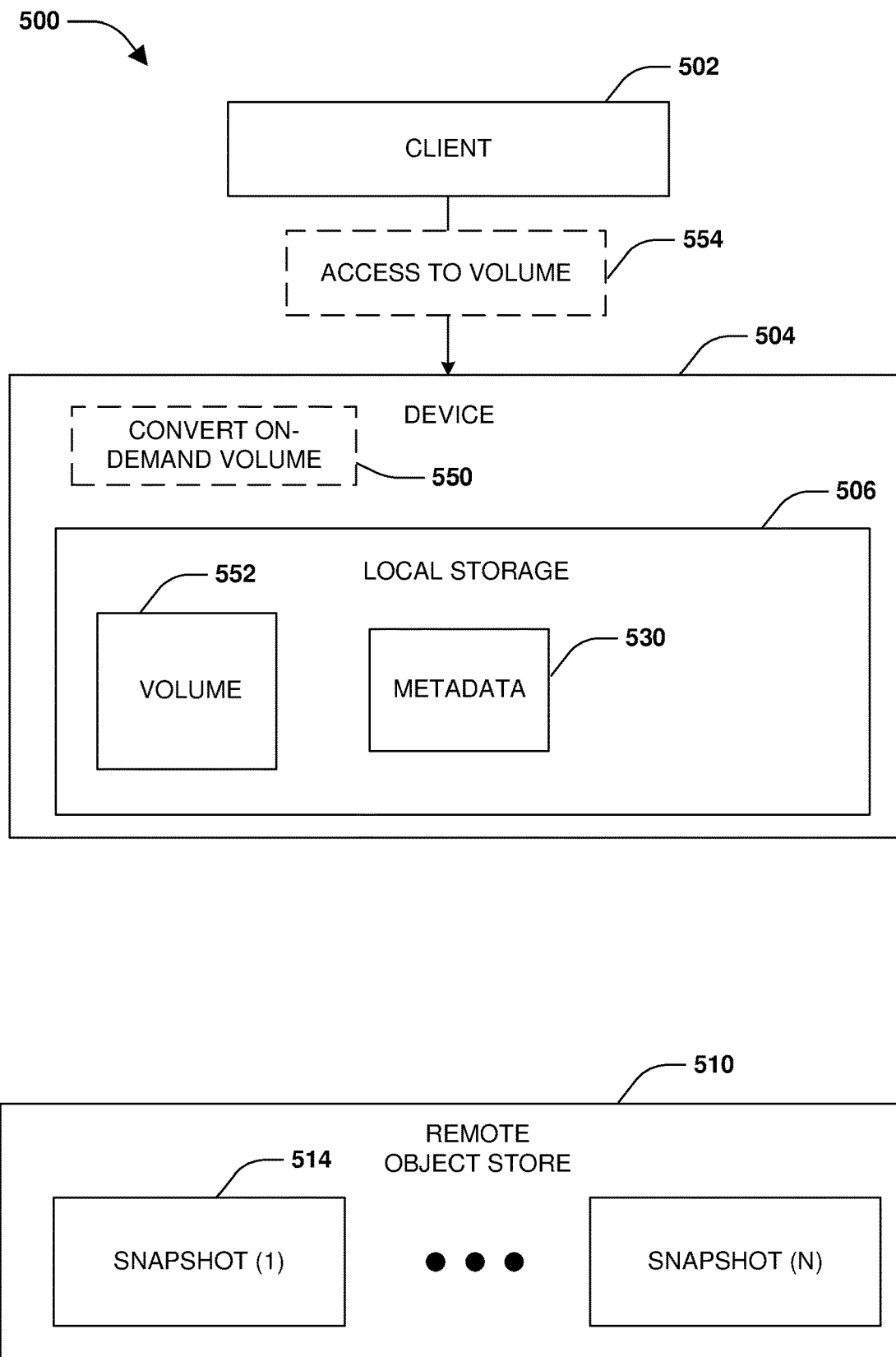
FIG. 5E is a block diagram illustrating an example system for on-demand restore of a snapshot to an on-demand volume accessible to clients, where the on-demand volume is converted to a volume.

In an example, in response to on-demand retrieving and caching the first subset of blocks as cached blocks, cloud block numbers within the metadata 530 for the first subset of blocks may be retained and absent indicators within the metadata 530 for the first subset of blocks may be replaced with physical volume block numbers of the cached blocks. When the restore process 520 restores the block of backup data from the first snapshot 514 within the remote object store 510 to the on-demand volume 522 within the local storage 506, the cloud block number within the virtual volume block number entry for the block may be replaced with a virtual volume block number of the block within the on-demand volume 522. Also, when the restore process 520 restores the block of backup data from the first snapshot 514 within the remote object store 510 to the on-demand volume 522 within the local storage 506, the absent indicator within the physical volume block number entry for the block may be replaced with a physical volume block number of the block within the local storage 506. In response to the restore process 520 completing, the on-demand volume 522 may be converted 550 to a volume 552 exposed to the client 502 and/or other clients for read and write access 554 of data through the volume 552, as illustrated by FIG. 5E. The volume 552 may correspond to a traditional volume where clients directly read and write data through a file system of the volume 552 to blocks stored within the local storage 506.

Figure 4B:
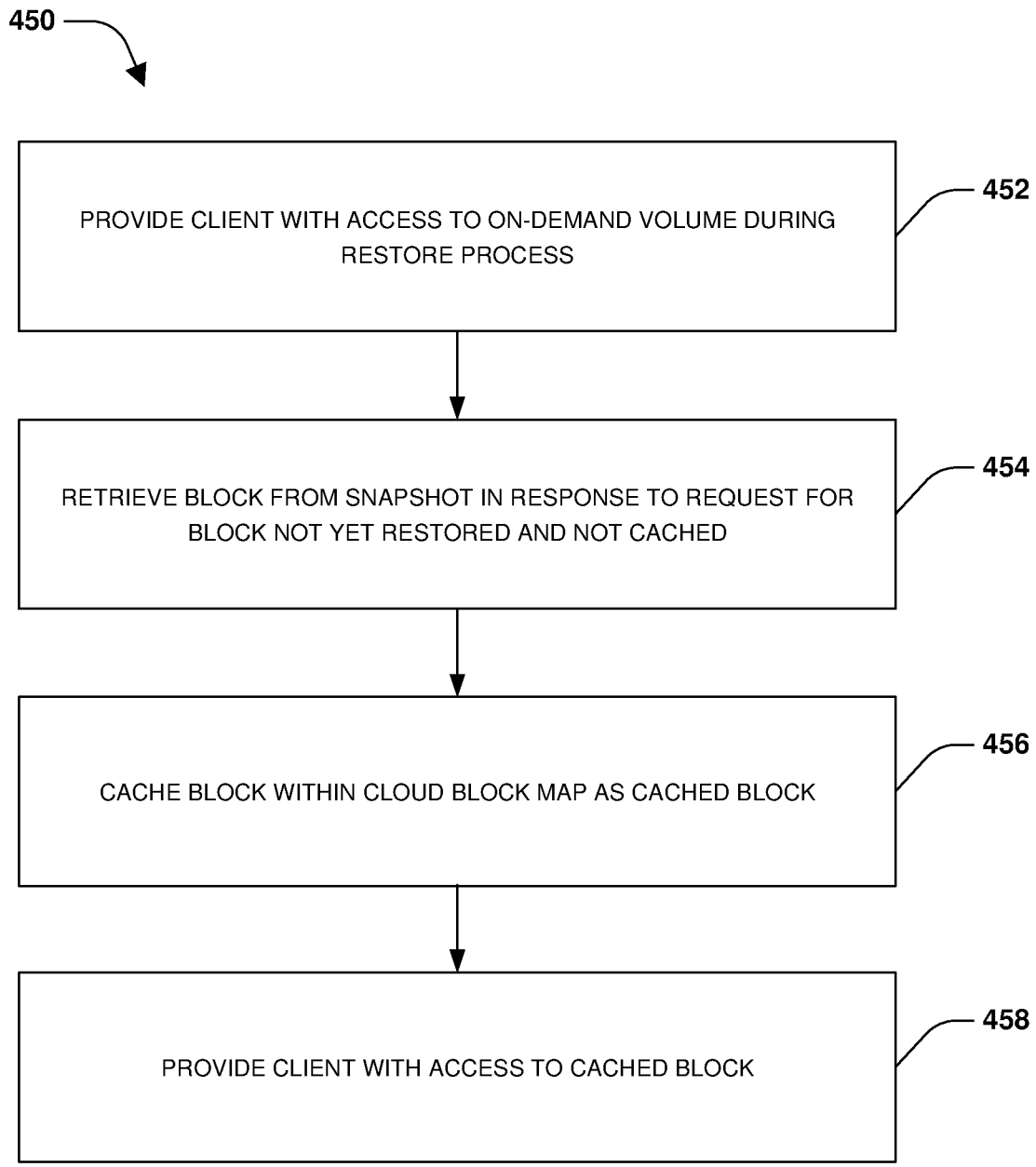
FIG. 4B is a flow chart illustrating an example method for caching data during an on-demand restore.

One embodiment of caching data during an on-demand restore using a cloud block map is illustrated by an exemplary method 400 of FIG. 4B, which is further described in conjunction with system 500 of FIGS. 5A-5D. A device 504 may store data on behalf of a client 502 within local storage 506, as illustrated by FIG. 5A. It may be appreciated that the device 504, configured to perform caching using a cloud block map during the on-demand restore, may be implemented as a node, a virtual machine, a container (e.g., a Kubernete container), through a Quark pod, a cloud computing environment, a server, an on-premise device, software, hardware, or a combination thereof. In an example, the device 504 may provide the client 502 with access to a volume 508 stored within the local storage 506. The device 504 may provide storage management functionality that can be used to provide backup, restore, and/or other storage functions. In an example, the device 504 may execute snapshot functionality in order to create snapshots of the volume 508 as point-in-time representations of the volume 508.

Storing the snapshots within the local storage 506 may become expensive over time. Accordingly, the device 504 may implement a backup operation 512 to store the snapshots within a remote object store 510, such as a cloud computing environment, that provides relatively lower cost scalable long term storage compared to the local storage 506. For example, the backup operation 512 may be implemented to transmit a first snapshot 514 of the volume 508 from the device 504 over a network to the remote object store 510. In some embodiments, the backup operation 512 may be implemented to create a snapshot, and then transmit the snapshot from the local storage 506 to storage of the remote object store 510. In some embodiments, the backup operation 512 may be implemented to transfer an existing snapshot from the local storage 506 of the device 504 to the remote object store 510. In this way, any number of snapshots may be stored within the remote object store 510, such as within objects according to an object format.

The device 504 may receive a restore request to restore the volume 508 back to a state captured by a snapshot such as the first snapshot 514. In an example, the device 504 may receive the request from the client 502. The request may specify the first snapshot 514 that is to be used to perform a restore process 520 (an on-demand restore operation) to restore the volume 508 back to the prior state captured by the first snapshot 514. In response to receiving the restore request to restore backup data within the first snapshot 514 stored within the remote object store 510, an on-demand volume 522 is created within the local storage 506 of the device 504, as illustrated by FIG. 5B. The on-demand volume 522 may initially be an empty volume into which the restore process 520 (the on-demand restore operation) will restore the backup data from the first snapshot 514 within the remote object store 510. Unlike a traditional volume where all client requests for data are processed through a file system of the traditional volume using data stored within the traditional volume, client access to the on-demand volume 522 can result in either retrieving already restored data from the on-demand volume 522 or an on-demand retrieval of not yet restored data from the first snapshot 514 within the remote object store 510.

As part of initializing the restore process 520, metadata 530 of the first snapshot 514 may be retrieved from the remote object store 510. The metadata 530 may be stored within the local storage 506 of the device 504, as illustrated by FIG. 5C. The metadata 530 may be retrieved before backup data of the first snapshot 514 is restored from the remote object store 510 to the on-demand volume 522 within the local storage 506 of the device 504.

The metadata 530 may identify blocks comprising the backup data of the first snapshot 514. In an embodiment, the metadata 530 may correspond to a tree structure, such as a buftree, comprising one or more levels of indirect blocks (pointers) that may be traversed from a root of the tree structure down through the tree structure to a bottom level of direct blocks corresponding to actual data. The metadata 530 (e.g., a level of indirect blocks that point to the bottom level of direct blocks) may comprise virtual volume block number entries mapped to physical volume block number entries. For example, a block of backup data within the first snapshot 514 may be associated with a virtual volume block number entry that is mapped to a physical volume block number entry. If the block has not yet been restored from the first snapshot 514 to the on-demand volume 522, then the virtual volume block number entry may be populated with a cloud block number of the block. The cloud block number may correspond to a location of the block stored within the remote object store 510, and thus may be used to locate and retrieve the block from the remote object store 510. Also, if the block has not yet been restored from the first snapshot 514 to the on-demand volume 522, then the physical volume block number entry may be populated with an absent indicator to indicate that backup data of the block has not yet been restored to the on-demand volume 522 and stored within the local storage 506 of the device 504.

If the block has been restored from the first snapshot 514 to the on-demand volume 522, then the virtual volume block number entry may be populated with a virtual volume block number of the block within the on-demand volume 522. Also, if the block has been restored from the first snapshot 514 to the on-demand volume 522, then the physical volume block number entry may be populated with a physical volume block number used to locate a storage location of the block within the local storage 506. In this way, the metadata 530 can be evaluated to determine whether a block has been restored to the on-demand volume 522 by the restore process 520 or has not yet been restored to the on-demand volume 522 by the restore process 520.

During operation 452 of method 400 of FIG. 4B, the client 502 is provided with access 542 to the on-demand volume 522 during the restore process 520 restoring 540 the backup data from the first snapshot 514 within the remote object store 510 to the on-demand volume 522 for storage within the local storage 506, as illustrated by FIG. 5D. In some embodiments, the client 502 is provided with the access 542 to the on-demand volume 522 during the restore process 520 once the metadata 530 has been copied from the remote object store 510 to the local storage 506. In this way, the restore process 520 is implemented to restore 540 the backup data from the first snapshot 514 within the remote object store 510 to the on-demand volume 522 for storage within the local storage 506.

In some embodiments of providing the client 502 with the access 542 to the on-demand volume 522 during the restore process 520, a request may be received by the device 504 from the client 502. The request may comprise a read operation, a write operation, or other type of operation. The request may target a particular block of data that has either been restored from the first snapshot 514 within the remote object store 510 to the on-demand volume 522 by the restore process 520 or has yet to be restored from the first snapshot 514 within the remote object store 510 to the on-demand volume 522 by the restore process 520.

In response to receiving the request, the metadata 530 may be evaluated to determine whether the block has been restored from the first snapshot 514 within the remote object store 510 to the on-demand volume 522 by the restore process 520 or has yet to be restored from the first snapshot 514 within the remote object store 510 to the on-demand volume 522 by the restore process 520. For example, the metadata 530 may be traversed (e.g., one or more levels within a buftree of a file comprising data contained with the block) to identify a virtual volume block number entry mapped to a physical volume block number entry for the block. If the virtual volume block number entry comprises a virtual volume block number and/or the physical volume block number entry comprises a physical volume block number, then the block has been restored from the first snapshot 514 within the remote object store 510 to the on-demand volume 522 by the restore process 520. Accordingly, the block may be retrieved from the local storage 506 through the on-demand volume 522 using the virtual volume block number and/or the physical volume block number. The block is then provided to the client 502 in response to the request. The block may be retrieved and provided to the client 502 while the restore process 520 is restoring 540 the backup data of the first snapshot 514 within the remote object store 510 to the on-demand volume 522. In this way, the client 502 is provided with access to already restored data through the on-demand volume 522 within the local storage 506 while the restore process 520 is restoring 540 the backup data of the first snapshot 514 within the remote object store 510 to the on-demand volume 522.

If the virtual volume block number entry comprises a cloud block number and/or the physical volume block number entry comprises an absent indicator, then the block has not yet been restored from the first snapshot 514 to the on-demand volume 522 by the restore process 520. Accordingly, a cloud block map 532 is evaluated to determine whether the block has been cached within the cloud block map 532. The cloud block map 532 may be stored within the local storage 506 of the device 504 so that the client 502 can be provided with low latency access to cached blocks within the local storage 506. This is because retrieving cached blocks of the cloud block map 532 from the local storage 506 is faster than retrieving backup data over a network from the remote object store 510. In this way, the cloud block map 532 can be used to provide the client 502 with low latency access to cached blocks of backup data of the first snapshot 514 not yet restored to the on-demand volume 522 by the restore process 520.

If the block being requested by the client 502 has not yet been restored to the on-demand volume 522 and has been cached as a cached block within the cloud block map 532, then the client 502 is provided with access to the cached block within the cloud block map 532. In an example, the metadata 530 comprises a cloud block number of the block being requested and an absent indicator because the block has not yet been restored to the on-demand volume 522. The cloud block number in the metadata 530 can be used to search the cloud block map 532 to determine whether the block has been cached within the cloud block map 532. That is, the cloud block map 532 maps cloud block numbers of cached blocks to physical volume block numbers of the cached blocks. The physical volume block numbers may correspond to storage locations of the cached blocks within the local storage 506. In this way, the cloud block number identified from the metadata 530 may be used to search the cloud block map 532 to determine whether the block has been cached within the cloud block map 532 as a cached block based upon the cloud block number being mapped to the physical volume block number of where the cached block is stored within the local storage 506 of the device 504. Accordingly, the client 502 is provided with access to the cached block located within the local storage 506 according to the physical volume block number in the cloud block map 532 if the block has been cached within the cloud block map 532 as the cached block.

If the block being requested by the client 502 has not yet been restored and is not cached within the cloud block map 532, then block may be retrieved 548, over a network connection between the device 504 and the remote object store 510, from the first snapshot 514 within the remote object store 510 using the cloud block number, during operation 454 of method 400 of FIG. 4B. The block may be retrieved while the restore process 520 is restoring 540 the backup data of the first snapshot 514 within the remote object store 510 to the on-demand volume 522 in the local storage 506. During operation 456 of method 400 of FIG. 4B, the block is cached within the cloud block map 532 stored within the local storage 506. For example, the cloud block number, identified from the metadata 530 and used to retrieve the block from the first snapshot within the remote object store 510, may be inserted into the cloud block map 532. The cloud block number is mapped to a physical volume block number of where the cached block is stored within the local storage 506. During operation 458 of method 400 of FIG. 4B, the client 502 is provided with access to the cached block within the cloud block map 532. The client 502 may access the cached block within the cloud block map 532 while the restore process 520 is restoring 540 the backup data of the first snapshot 514 within the remote object store 510 to the on-demand volume 522 in the local storage 506.

The cached block may comprise backup data of a file captured by the first snapshot 514 in the remote object store 510. As part of the restore process 520, the file is to be restored to the on-demand volume 522 according to the state of the file captured by the first snapshot 514. Accordingly, any modifications to the cached block within the cloud block map 532 by the client 502 are not propagated to the file being restored to the on-demand volume 522. This preserves the integrity of the file being restored by the restore process 520.

When the restore process 520 restores the block of backup data from the first snapshot 514 within the remote object store 510 to the on-demand volume 522 within the local storage 506, the cloud block number within the virtual volume block number entry for the block may be replaced with a virtual volume block number of the block within the on-demand volume 522. Also, when the restore process 520 restores the block of backup data from the first snapshot 514 within the remote object store 510 to the on-demand volume 522 within the local storage 506, the absent indicator within the physical volume block number entry for the block may be replaced with a physical volume block number of the block within the local storage 506. When the restore process 520 restores the block of backup data, a determination may be made as to whether the block was cached within the cloud block map 532. If the block was cached within the cloud block map 532 as the cached block, then the cached block is evicted/removed from the cloud block map 532.

Temperature tracking 544 and an eviction scanner 546 may be implemented so that the storage space consumed by the cloud block map 532 is not wasted in storing cached blocks that are no longer being access by the client 502. Accordingly, temperature metrics of cached blocks within the cloud block map 532 are tracked. A temperature metric for a cached block is derived from a last time that the cached block was accessed. In an example, an evaluation may be periodically performed to determine whether the cached block has been accessed since a last evaluation. If the cached block has not been accessed since the last evaluation, then the temperature metric for the cached block is decreased to indicate that the cached block is becoming more infrequently accessed ("colder"). If the cached block has been accessed since the last evaluation, then the temperature metric for the cached block is increased to indicate that the cached block is becoming more frequently accessed ("hotter").

The eviction scanner 546 may be executed to evaluate the temperature metrics of the cached blocks to determine whether to evict (remove) or retain the cached blocks in the cloud block map 532. In response to the eviction scanner 546 determining that the temperature metric of the cached block is below a threshold indicating that the cached block is infrequently accessed ("cold"), the cached block is evicted from the cloud block map 532 in order to conserve storage spaced consumed by the cloud block map 532. In response to the eviction scanner 546 determining that the temperature metric of the cached block exceeds the threshold indicating that the cached block is frequently accessed ("hot"), the cached block is retained within the cloud block map 532 for low latency access by the client 502.

In response to the restore process 520 completing, the on-demand volume 522 may be converted to a volume exposed to the client 502 and/or other clients for read and write access of data through the volume. The volume may correspond to a traditional volume where clients directly read and write data through a file system of the volume to blocks stored within the local storage 506.

Figure 6:
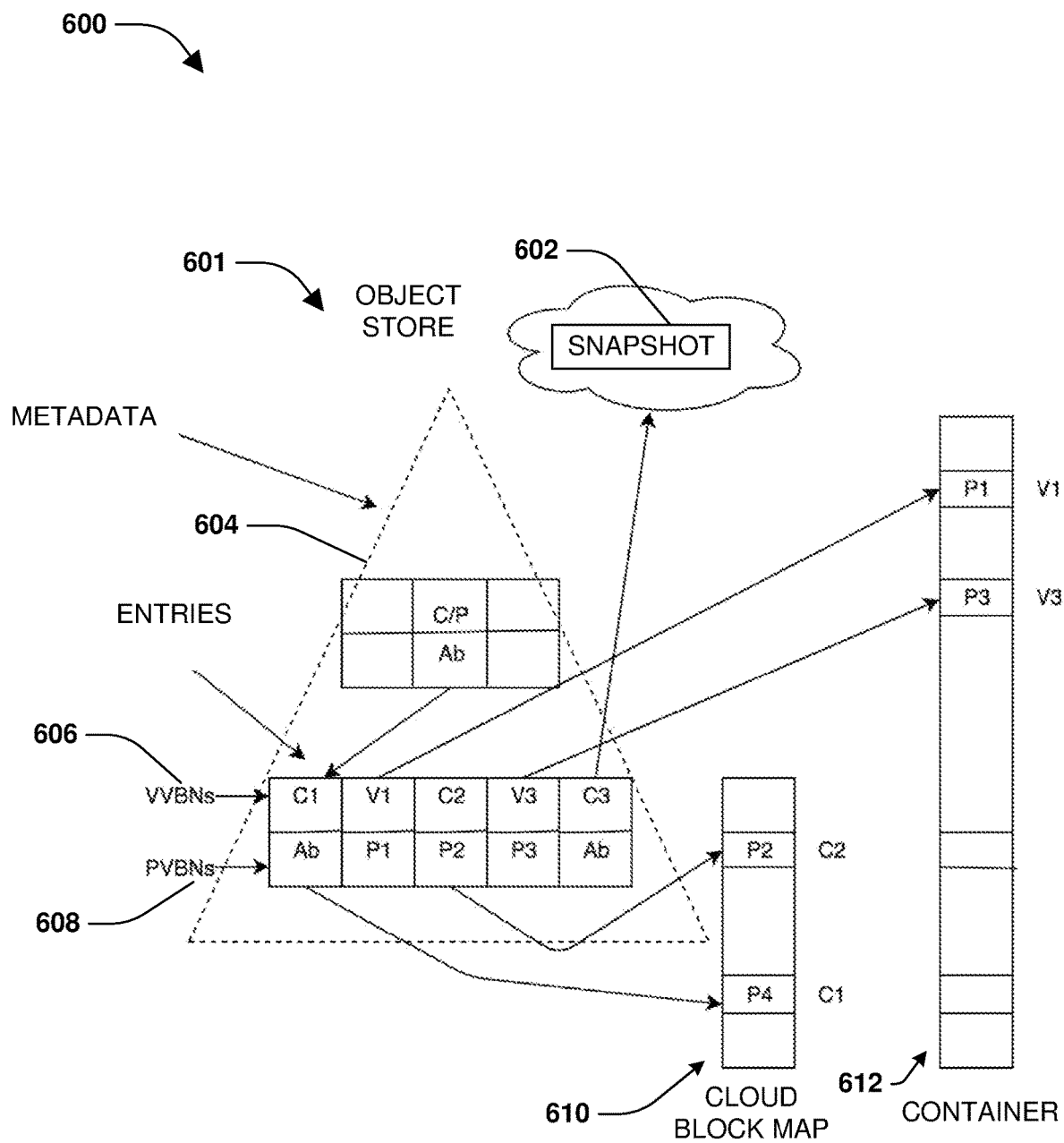
FIG. 6 is a block diagram illustrating an example system for on-demand restore of a snapshot to an on-demand volume accessible to clients.

FIG. 6 illustrates an example system 600 for on-demand restore of a snapshot to an on-demand volume, within local storage (e.g., on-premise storage), accessible to clients. A remote object store 601 (e.g., remote to the local storage, such as by being located within a cloud computing environment) may store a snapshot 602 of a volume that has been backed up from local storage to the remote object store 601. Metadata 604 of the snapshot 602 may correspond to a buftree hierarchy comprising one or more levels of indirect blocks and a bottom level of direct blocks. The metadata 604 of the snapshot 602 may be stored with the snapshot 602 in the object store. The indirect blocks may comprise pointers to blocks within a level below the indirect blocks. The direct blocks may correspond to user data. The metadata 604 may comprise entries corresponding to buftree indirect blocks. The entries may comprise virtual volume block number entries 606 mapped to physical volume block number entries 608. Each block of backup data may be associated with a virtual volume block number entry and a physical volume block number entry. As part of a restore process to restore backup data from the snapshot 602 in the remote object store 601 to the on-demand volume within the local storage, the metadata 604 is retrieved from the object store 601 and is locally stored within the local storage where the on-demand volume is created.

If a virtual volume block number entry comprises a virtual volume block number (e.g., virtual volume block number V1) and/or a physical volume block number entry comprises a physical volume block number (e.g., physical volume block number P1), then the block has been restored from the snapshot 602 to the on-demand volume by the restore process (e.g., an on-demand restore operation). Accordingly, the virtual volume block number and/or the physical volume block number entry may be used to provide a client with access the block, such as through a container file 612 located at the local storage, during the restore process. In some embodiments, the container file 612 is used by a file system of a volume (e.g., a volume being restored, an on-demand volume, etc.) to address blocks of data stored within physical storage. For example, the container file 612 maps virtual volume block numbers (e.g., a virtual volume block number specifying a block's offset in the container file 612) to physical volume block numbers of where blocks of data are stored within the physical storage (e.g., a physical volume block number specifying a block's location within an aggregate). In some embodiments, the container file 612 contain the blocks of the volume, and thus addresses within the volume refer to offsets of blocks within the container file 612.

If a virtual volume block number entry comprises a cloud block number (e.g., cloud block number C1) and/or a physical volume block number entry comprises an absent indicator (e.g., Ab), then the block has not yet been restored from the snapshot 602 to the on-demand volume by the restore process. If the block has not yet been restored and is not cached within a cloud block map 610 located at the local storage, then the cloud block number may be used to retrieve the block from the snapshot 602 (e.g., cloud block number C1 may be used to locate and retrieve the block from the remote object store 601). The block may be stored within the cloud block map 610 (e.g., cloud block number C1 may be mapped to physical volume block number P4 of where the block is stored within local storage), and a client may be provided with access to the block through the cloud block map 610 during the restore process.

Figure 7:
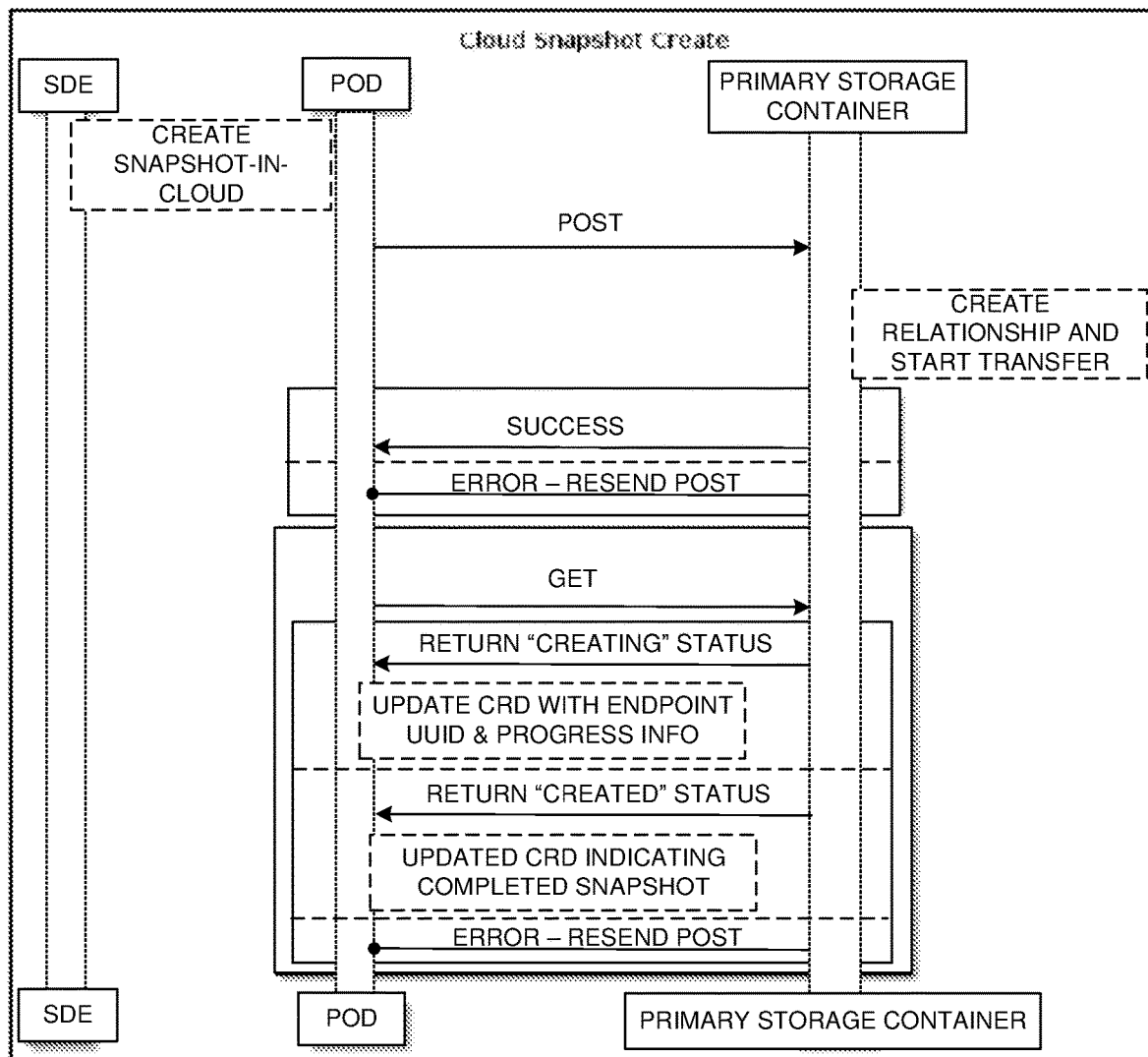
FIG. 7 is a flow chart illustrating an example method for implementing requests associated with objects stored within a remote object store.
Figure 8:
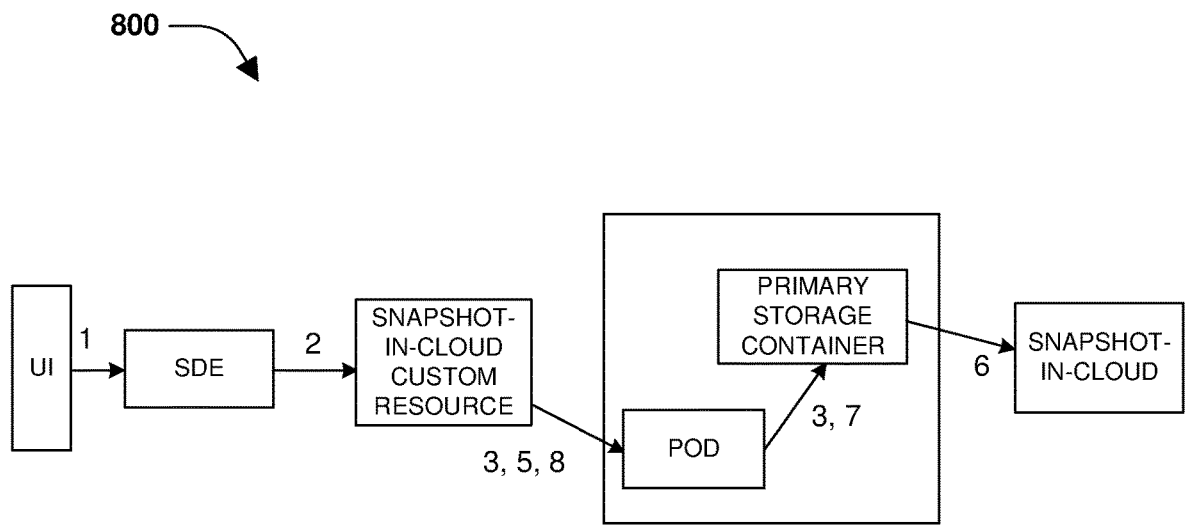
FIG. 8 is a component block diagram illustrating an example system for implementing requests associated with objects stored within a remote object store.

FIGS. 7 and 8 depict examples 700, 800 of snapshot creation of a snapshot that be used by an on-demand restore process. In an embodiment, a user selects a volume, and requests creation of a snapshot-in-cloud. An SDE (e.g., a client) creates a CR for the snapshot-in-cloud (e.g., a custom resource (CR) records the snapshot-in-cloud UUID provided by SDE). Pod (e.g., a component/module implemented by software, hardware, or combination there) picks up the custom resource (CR) for Cloud Snapshot creation and sends a POST to a primary storage container to start the transfer. A POST payload includes the following: cloud bucket info and credentials (bucket info, secret/access) and Snapshot UUID. The primary storage container does the following upon receiving the request: creates a mirroring relationship if not present; creates or recreates object store configuration if not present or if information has changed; triggers a 'mirror update' or 'mirror initialize' depending on whether this was the first time snapshot-in-cloud was created or this is a subsequent creation; any failure in the above steps will return an error to POST response. The Pod updates CR with some indication that transfer is 'in progress' so that the Pod will now start sending a GET. A mirror transfer is started and automatically creates a Snapshot on the source volume to replicate to the cloud bucket. UUID for the Snapshot is supplied by SDE, and the Snapshot on the volume will be stamped with this same UUID. Once a snapshot-in-cloud is created for a volume, there will be a single Snapshot on the source volume while transfer is idle, and two such Snapshots while the transfer is running. The Snapshot (Volume Snapshot) is stamped with the same UUID. The Pod polls a primary storage container using a GET which returns: Status Creating, created or an error, bytes transferred, transfer progress in % (to be stored in CRD), endpoint UUID (to be stored in CRD), logical space (to be stored in CRD). When transfer completes, the Pod updates the CRD indicating Snapshot-in-cloud is created.

Figure 9:
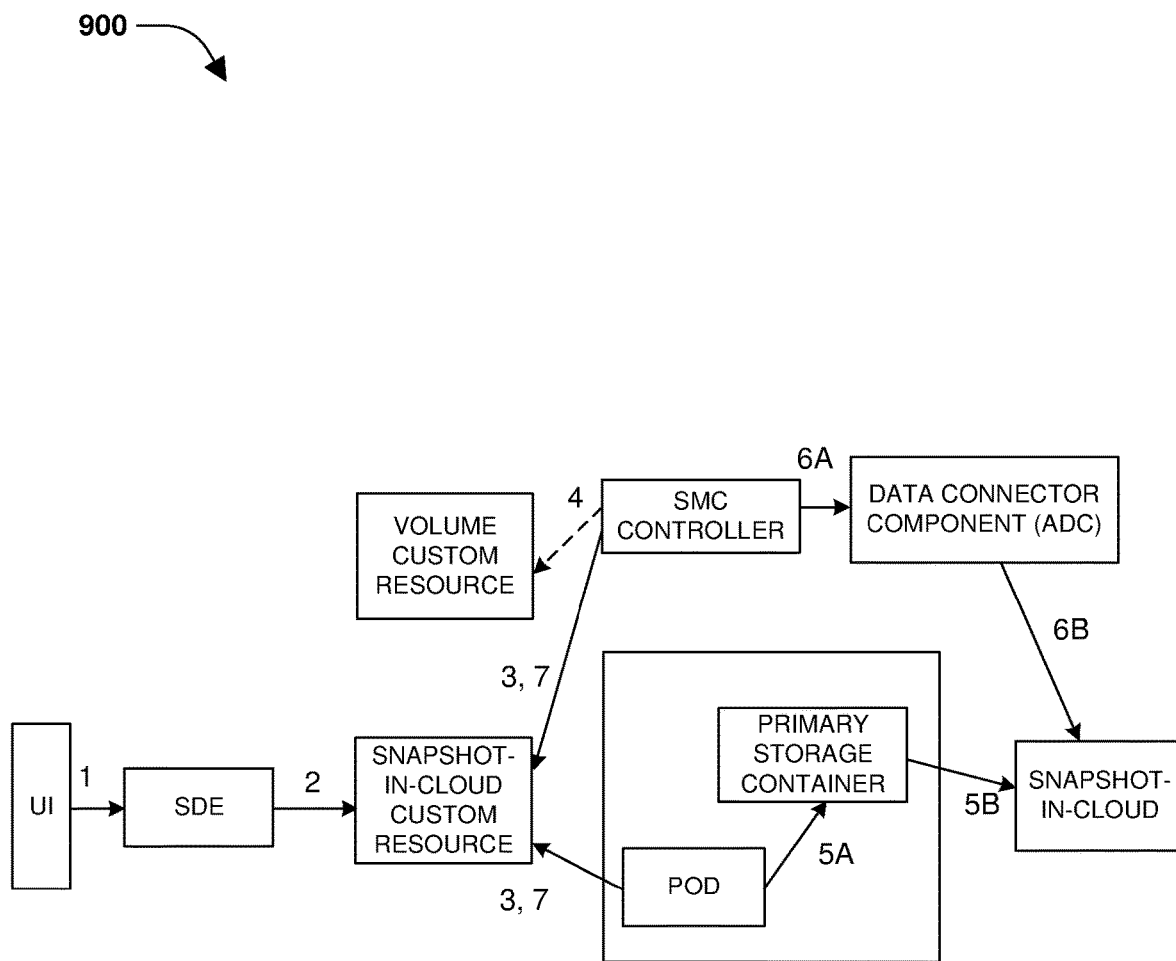
FIG. 9 is a component block diagram illustrating an example system for implementing requests associated with objects stored within a remote object store.

FIG. 9 depicts an example 900 of snapshot management utilizing a data connector component (ADC), such as deleting a snapshot. In an embodiment, a user selects a Snapshot-in-cloud to delete from the UI. An SDE (via NVC Client) deletes the Snapshot-in-cloud CR. The Pod and SMC Controller detects the Snapshot-in-cloud CR deletion. The SMC Controller checks to see whether the Volume CR is present or not. If the Volume CR is present, this indicates that the Pod is still alive and allows Pod to handle the Snapshot-in-cloud deletion. If the Volume CR is gone, SMC Controller handles the deletion. If the Volume CR is present: Pod repeatedly sends DELETE REST request to primary storage container until complete (i.e., return HTTP Status 404); and primary storage container asynchronously deletes the objects associated with individual Snapshot-in-cloud or the endpoint from the bucket. If the Volume CR not is present: SMC Controller sends DELETE REST request to data connector component (ADC) until complete (i.e., returns HTTP Status 404); and the ADC either marks the Snapshot-in-cloud as deleted or asynchronously deletes the endpoint (all objects) from the bucket. Once the Pod or SMC Controller receives a NOT FOUND response from primary storage container/ADC respectively, the finalizer is removed from the Snapshot-in-cloud CR, allowing the CR to be completely removed.

Figure 10:
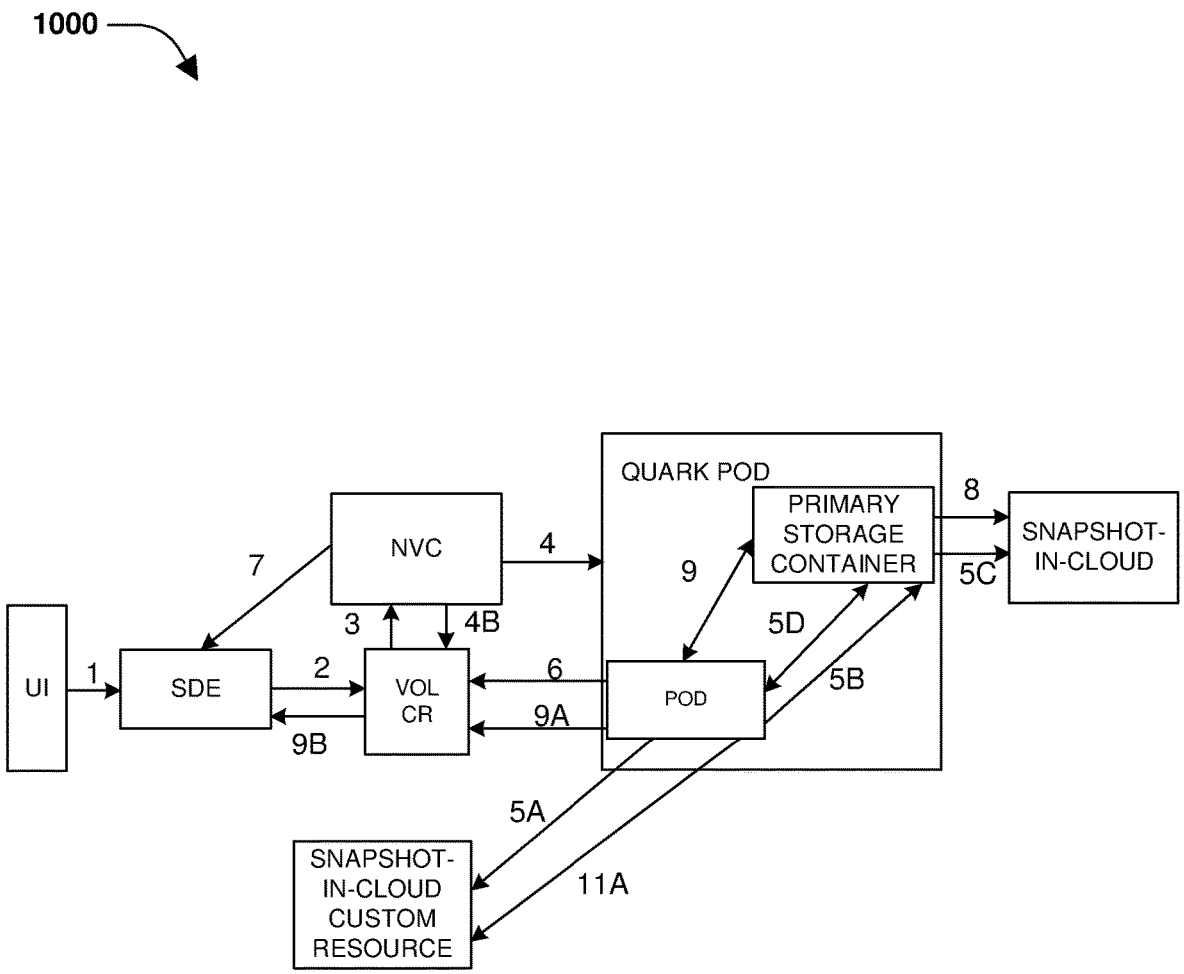
FIG. 10 is a component block diagram illustrating an example system for implementing requests associated with objects stored within a remote object store.

FIG. 10 depicts an example 1000 of snapshot management, such as performing a snapshot restore by an on-demand restore process. In an embodiment, a user selects the cloud snapshot in the front end which is to be restored. The SDE creates a Volume Custom Resource (CR) to be used for Cloud Snapshot Restore. This CR stores the cloud snapshot UUID. NVC picks up the Volume CR to be used to create the Quark POD. In an example, the space needed for the restored primary storage container is 30% more than the logical space of the cloud snapshot. NVC creates a new Quark POD based on the Volume CR. Based on the Snapshot-in-cloud UUID present in the Volume CR, the primary storage container volume will be created as a DP volume used for OnDemand restore. NVC updates the volume status in the Volume CR after the POD creation is successful. In an example, the volume is not usable by the clients at this point. Volume GET returns 'offline' state at this point.

Pod (from the POD created), picks up the endpoint details from the Snapshot-in-cloud CR and issues REST calls to the primary storage container to start Ondemand restore. The pod updates the Snapshot-in-cloud CR by incrementing a refcount to prevent deletion of the CR. The pod sends a PATCH request to a primary storage container with an endpoint and cloud snapshot details (REST API details). The primary storage container issues Ondemand restore to the DP volume from the cloud snapshot. The pod keeps polling the primary storage container for Ondemand restore progress using GET calls.

While restore is in the setup phase, a state of 'preparing' will be return. Once this changes to 'restoring', the volume is considered mountable by the client. The pod updates the Ondemand restore progress in the Volume CR. Once GET returns a 'restoring' state, the pod updates the Volume CR to indicate that volume is ready to be mounted. The pod sets 'restoring' and 'online' state in Volume CR. The primary storage container converts the DP volume to Read-Write. The volume can be used by the clients. The volume remains an Ondemand volume and clients may observe lower performance. NVC client creates a VolumeOnline event which is picked up by the SDE and the volume is shown as online in the front end UI. Primary storage container starts the phase 2 scanner (data pull) automatically. Pod polls the primary storage container using REST calls to get the phase 2 scanner progress and updates the Volume CR. Once all the data is pulled, primary storage container converts the Ondemand volume to a normal volume. The performance limitations no longer apply and the volume performs like any read/write volume. Once the transfer completes the pod is assigned a 'restored' state. The pod decrements the refcount from the Snapshot-in-cloud CR.

Figure 11A:
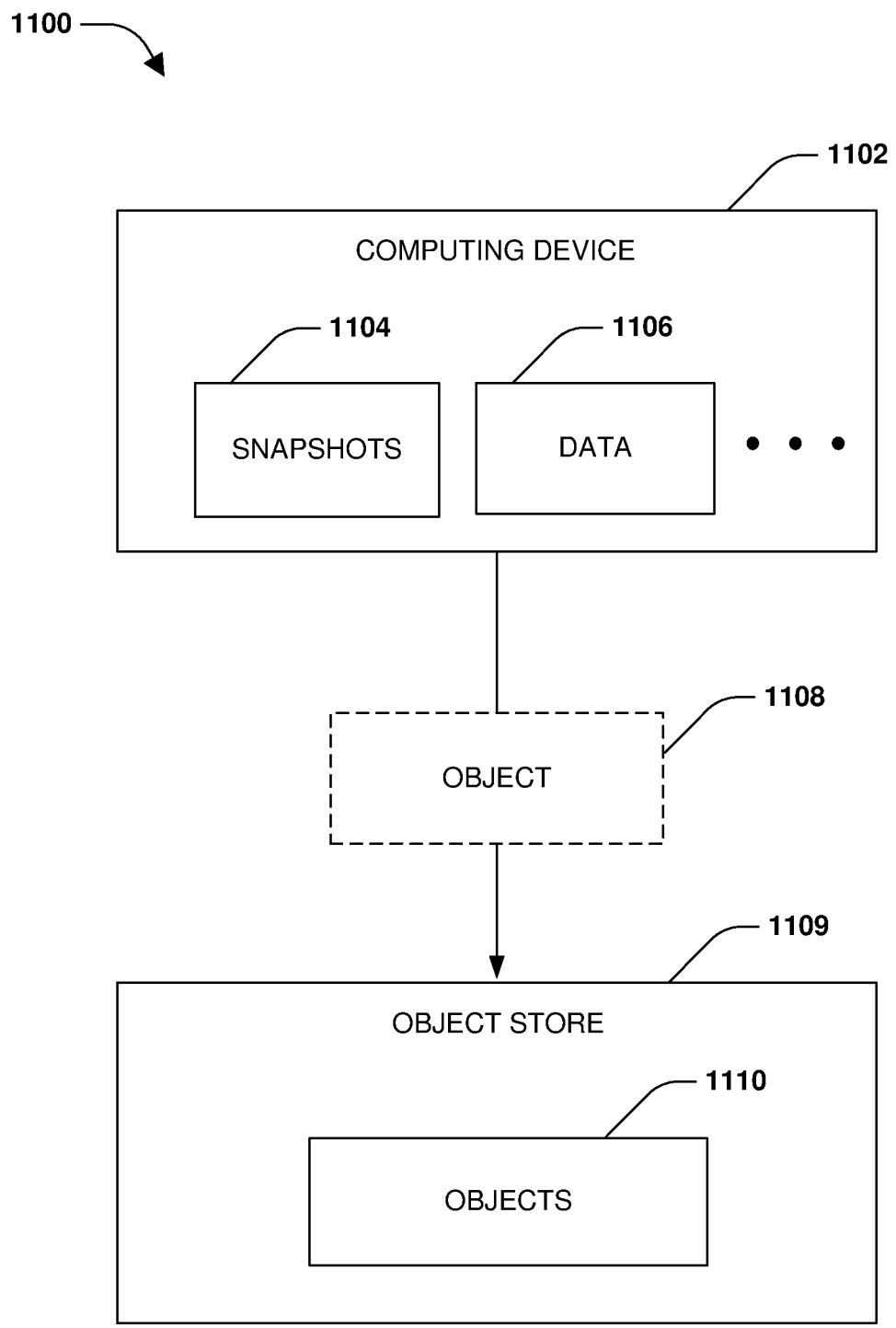
FIG. 11A is a component block diagram illustrating an example system for managing objects within an object store using an object file system.

FIG. 11A illustrates a system 1100 for managing objects within an object store (a remote object store) using an object file system. The objects may store backup data of snapshots that can be restored on-demand to an on-demand volume using a restore process (e.g., an on-demand restore operation) such that clients are provided with access to the backup data during and before completion of the restore process. A computing device 1102 may comprise a node, a storage controller, a storage service, an on-premises computing device, a storage virtual machine, or any other hardware or software. The computing device 1102 may store data 1106 within storage devices (primary storage) managed by the computing device 1102. The computing device 1102 may provide client devices with access to the data 1106, such as by processing read and write operations from the client devices. The computing device 1102 may create snapshots 1104 of the data 1106, such as a snapshot of a file system of a volume accessible to the client devices through the computing device 1102. The computing device 1102 may be configured to communicate with an object store 1109 over a network. The object store 1109 may comprise a cloud computing environment remote to the computing device 1102.

As provided herein, an object file system and object format is provided for storing and accessing data, such as snapshots, stored within objects in the object store 1109. The data 1106, maintained by the computing device, is stored into a plurality of slots of an object 1108. Each slot represents a base unit of data of the object file system defined for the object store 1109. For example, the object 1108 comprises or any other number of slots (e.g., 1024 slots), wherein each slot comprises 11 kb of data or any other amount of data. It may be appreciated that objects may comprise any number of slots of any size. User data, directory blocks, metadata, and/or inofile blocks of an inofile comprising per inode metadata is stored into the slots of the object 1108. In an example, snapshot data, of a snapshot created by the computing device 1102 of a file system maintained by the computing device 1102, is stored into the object 1108. For example, the object 1108 may be maintained as an independent logical representation of the snapshot, such that data of the snapshot is accessible through the object 1108 without having to reference other logical copies of other snapshots stored within objects 1110 of the object store 1109. In an example, the data is converted from physical data into a version independent format for storage within the object 1108.

In an example, the object 1108 is created to comprise data in a compressed state corresponding to compression of the data within the primary storage of the computing device 1102. In this way, compression used by the computing device 1102 to store the data is retained within the object 1108 for storage within the object store 1109. The object 1108 may be assigned a unique sequence number. Each object within the object store 1109 is assigned unique sequence numbers.

An object header may be created for the object 1108. The object header comprises a slot context for slots within the object 1108. The slot context may comprise information relating to a type of compression used for compressing data within the object 1108 (if any compression is used), a start offset of a slot, a logical data length, a compressed data length, etc. The slot context may be used to access compressed data stored within the object 1108.

Figure 11B:
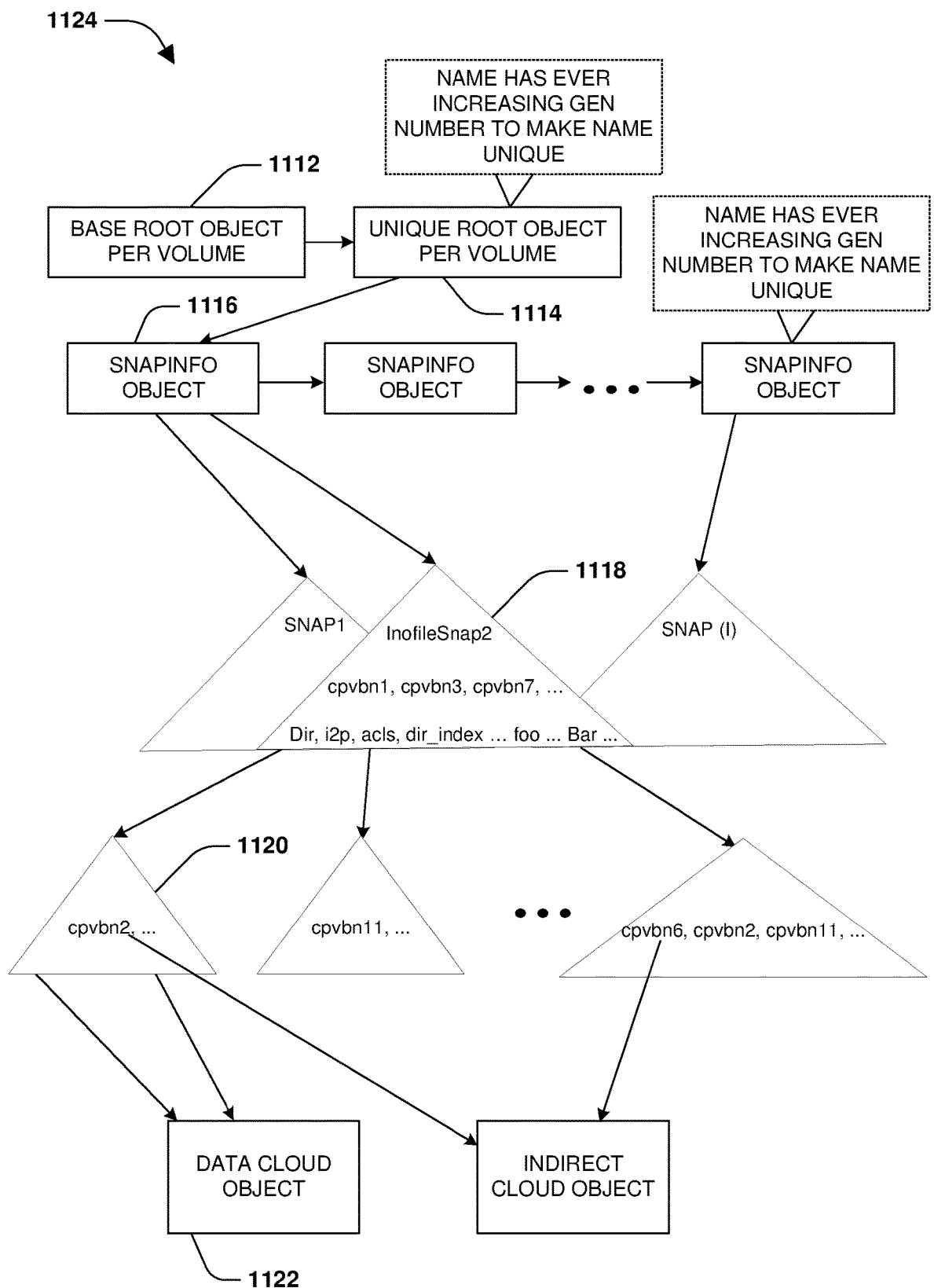
FIG. 11B is an example of a snapshot file system within an object store.
Figure 11C:
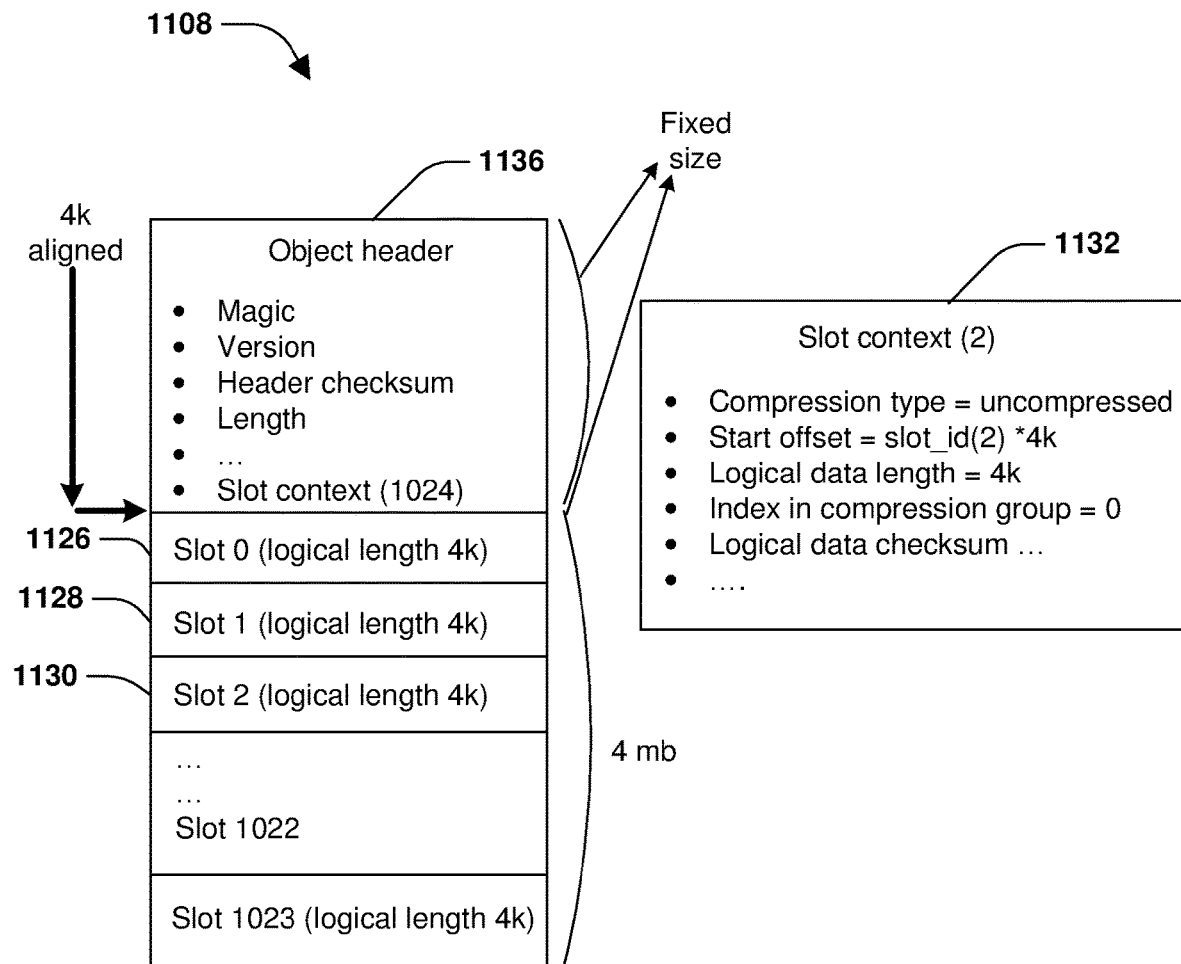
FIG. 11C is an example of an object stored within an object store.

FIG. 11C illustrates an example of the object 1108. The object 1108 comprises an object header 1136 and a plurality of slots, such as a slot 1126, a slot 1128, a slot 1130, and/or any other number of slots. The object header 1136 may have a size that is aligned with a start of the plurality of slots, such as having a 11 kb alignment based upon each slot having a logical length of 11 kb. It may be appreciated that slots may have any length. The object header 1136 comprises various information, such as a version identifier, a header checksum, a length of the object 1108, a slot context 1132, and/or other information used to access and manage data populated into the slots of the object 1108.

The slot context 1132 comprises various information about the slots, such as a compression type of a slot (e.g., a type of compression used to compress data of slots into a compression group or an indicator that the slot does not comprise compressed data), a start offset of the slot within the object 1108 (e.g., a slot identifier multiplied by a slot size, such as 11 kb), a logical data length of the slot (e.g., 11 kb), a compressed length (e.g., 0 if uncompressed), an index of the slot within a compression group of multiple slots (e.g., 0 if uncompressed), a logical data checksum, etc.

The data stored within the slots of the object 1108 are represented as a data structure (e.g., a structure that is traversable by a data connector component). The data structure may comprise a tree structure or any other type of structure. For example, the data structure comprises the tree structure representing a file. The data structure may be populated with a plurality of nodes at various levels of the tree structure. The nodes may be represented by cloud block numbers. A cloud block number of a node may comprise a sequence number used to uniquely identify the object 1108 and/or a slot number of a slot comprising a portion of the data represented by the node. User data, directory blocks, metadata, inofile blocks of an inofile, and/or other data stored within the slots of the object 1108 may be represented by nodes within the data structure. In an example, user data is stored within leaf nodes of the data structure (e.g., nodes within a level 0 (L0) level of the tree structure). Pointers (indirects) may be stored within non-leaf nodes of the data structure (e.g., nodes within a level 1 (L1), a level 2 (L2), and/or other levels of the tree structure). An inode object for the file may comprise pointers that point to non-leaf nodes within a top level of the data structure.

In an example of the tree structure, a 1 TB file may be represented by the tree structure. An inode of the file may comprise metadata and/or a flat list of 4845 pointers or any other number of pointers to nodes within a level 2 of the tree structure (e.g., there are 4845 nodes (4 kb blocks) within the level 2 of the tree structure). The level 2 comprises the 4845 nodes (4 kb blocks), each having 255 pointers or any other number of pointers to nodes within a level 1 of the tree structure (e.g., there are 980393 (4 kb blocks) within the level 1 of the tree structure. The level 1 comprises the 980393 (4 kb blocks), each having 255 pointers to nodes within a level 0 of the tree structure. The level 0 comprises 250,000,000 nodes (4 kb blocks) representing actual data, such as user data.

FIG. 11B illustrates a snapshot file system of data structures 1124 (e.g., a tree structure that can be traversed by a data connector component) used to represent snapshots (e.g., snapshots of one or more volumes managed by the computing device 1102) stored into the objects 1110 of the object store 1109. There is one base root object per volume, such as a base root object 1112 for a volume of which the snapshots were captured. There is a unique root object per volume, such as a unique root object 1114 for the volume. The base root object 1112 may point to the unique root object 1114. Names of the unique root objects may be derived from increasing generation numbers. The unique root object 1114 may point to snapinfo objects, such as a snapinfo object 1116 comprising information regarding one or more snapshots, such as a pointer to an inofile 1118 of a second snapshot of the volume. The inofile 1118 comprises cloud block numbers of slots within an object comprising data of the second snapshot, such as a pointer to an indirect 1120 that points to data 1122 of the snapshot. The inofile 1118 may comprise or point to information relating to directories, access control lists, and/or other information.

A mapping metafile (a VMAP) is maintained for the object 1108. The mapping metafile maps block numbers of primary storage of the computing device 1102 (e.g., virtual volume block numbers of the data stored into slots of the object 1108) to cloud block numbers of nodes representing portions of the data stored within the slots of the object 1108. The object 1108 is stored within the object store 1109. In an example of storing objects into the object store 1109, the plurality of snapshots 1104, maintained by the computing device 1102, are stored within objects 1110 of the object store 1109. Each snapshot is identifiable through a snapinfo object that has a unique generation number. As will be described later, the objects 1110 within the object store 1109 may be deduplicated with respect to one another (e.g., the object 1108 is deduplicated with respect to the object 1110 using the mapping metafile as part of being stored into the object store 1109) and retain compression used by the computing device 1102 for storing the snapshots 1104 within the primary storage.

The mapping metafile and/or the data structure are used to provide access through the object file system to portions of data within the slots of the object 1108 in the object store 1109. In an example, the inode object and the data structure are traversed to identify a sequence number and slot number of requested data. The sequence number and the slot number are used to access the requested data within a corresponding slot of the object 1108. In an example, a read request targets a 100,000$^{th}$ level 0 block stored within the object 1108. The inode object is read to calculate which blocks in each level of the data structure will have 100,000 (e.g., 100,000/255 is a 493th block in level 1 and 493/255 is a 2$^{nd}$ block in level 2). These blocks are read at each level to go to a next level through appropriate pointers (e.g., cloud block numbers) until the data is read from a block of user data within the level 0. The pointers are cloud block numbers, where a pointer comprises a sequence number of the object 1108 and a slot number. The sequence number corresponds to an object name of the object 1108 and the slot number is which slot the data is located within the object 1108.

In an embodiment, an on-demand restore of data within a snapshot stored within objects of the object store 1109 can be performed to a target computing device using the mapping metafile and/or the data structure. In an embodiment, the mapping metafile and/or the data structure may be used to free objects from the object store 1109 based upon the objects comprising snapshot data of snapshots deleted by the computing device 1102.

In an embodiment, the mapping metafile and/or an overflow mapping metafile are used to facilitate the copying of the snapshots to the object store 1109 in a manner that preserves deduplication and compression, logically represents the snapshots as fully independent snapshots, and provides additional compression. In particular, the mapping metafile is populated with entries for block numbers (e.g., virtual volume block numbers, physical volume block numbers, etc. used by the node to reference data such as snapshot data stored by the node) of the snapshots 1104 maintained by the computing device 1102 and copied into the objects 1110 of the object store 1109 as copied snapshots. An entry within the mapping metafile is populated with a mapping between a block number of data within a snapshot at the computing device 1102 (e.g., a virtual volume block number) and a cloud block number (e.g., a cloud physical volume block number) of a slot within an object into which the data was copied when the snapshot was copied to the object store 1109 as a copied snapshot. The entry is populated with a compression indicator to indicate whether data of the block number is compressed or not (e.g., a bit set to a first value to indicate a compressed virtual volume block number and set to a second value to indicate a non-compressed virtual volume block number).

The entry is populated with a compression group start indicator to indicate whether the block number is a starting block number for a compression group of a plurality of block numbers of compressed data blocks. The entry is populated with an overflow indicator to indicate whether the data block has an overflow entry within the overflow mapping metafile. The overflow mapping metafile may comprise a V+ tree, such as a special B+ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number). The entry may be populated with a logical length of an extent associated with the block number. The entry may be populated with a physical length of the extent associated with the block number.

The mapping metafile and/or the overflow mapping metafile may be indexed by block numbers of the primary storage (e.g., virtual volume block numbers of snapshots stored by the computing device 1102 within the primary storage, which are copied to the object store as copied snapshots). In an example, the block numbers may correspond to virtual volume block numbers of data of the snapshots stored by the computing device 1102 within the primary storage. In an example, a block number corresponds to a starting virtual volume block number of an extent of a compression group.

The mapping metafile and/or the overflow mapping metafile is maintained according to a first rule specifying that the mapping metafile and/or the overflow mapping metafile represent a comprehensive set of cloud block numbers corresponding to a latest snapshot copied to the object. The mapping metafile and/or the overflow mapping metafile is maintained according to a second rule specifying that entries within the mapping metafile and/or the overflow mapping metafile are invalidated based upon any block number in the entries being freed by the computing device 1102.

The mapping metafile and/or the overflow mapping metafile is used to determine what data of the current snapshot is to be copied to the object store 1109 and what data already exists within the object store 1109 so that only data not already within the object store 1109 is transmitted to the object store 1109 for storage within an object. Upon determining that the current snapshot is to be copied to the object store 1109, an invalidation phase is performed. In particular, a list of deallocated block numbers of primary storage of the computing device 1102 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

After the invalidation phase, a list of changed block numbers corresponding to changes between the current snapshot of the primary storage being copied to the object store 1109 and a prior copied snapshot already copied from the primary storage to the object store 1109 is determined. The mapping metafile is evaluated using the list of changed block numbers to identify a deduplicated set of changed block numbers without entries within the mapping metafile. The deduplicated set of changed block numbers correspond to data, of the current snapshot, not yet stored within the object store 1109.

An object is created to store data of the deduplicated set of changed block numbers. The object comprises a plurality of slots, such as 1024 or any other number of slots. The data of the deduplicated set of changed block numbers is stored into the slots of the object. An object header is updated with metadata describing the slots. In an example, the object is created to comprise the data in a compressed state corresponding to compression of the data in the primary storage. The object can be compressed by combining data within contiguous slots of the object into a single compression group. In this way, compression of the current snapshot maintained by the node is preserved when the current snapshot is stored in the object store as the object corresponding to a copy of the current snapshot.

The object, comprising the data of the deduplicated set of changed block numbers, is transmitted to the object store 1109 for storage as a new copied snapshot that is a copy of the current snapshot maintained by the node. The object is stored as a logical copy of the current snapshot. Also, additional compression is applied to this logical data, and information used to uncompress the logical data is stored in the object header. Further, the object is maintained as an independent logical representation of the current snapshot, such that copied data, copied from the current snapshot, is accessible through the object without having to reference other logical copies of other copied snapshots stored in other objects within the object store 1109. Once the object is stored within the object store 1109, the mapping metafile and/or the overflow mapping metafile is updated with entries for the deduplicated set of changed block numbers based upon receiving an acknowledgment of the object being stored by the object store 1109. An entry will map a changed block number to a cloud block number of a slot within which data of the changed block number is stored in the object.

In an embodiment, the object file system is used to provide various primary storage system services for the object store 1109 in order to achieve efficient space and resource management, and flexible scaling in the object store 1109 (e.g., a cloud computing environment). Additionally, pseudo read only snapshots are provided through the object store 1109. Consumers of these snapshots may choose to derive just the logical data represented by these snapshots or can additionally derive additional metadata associated with the logical data if required. This additional metadata is created post snapshot creation and hence is not directly part of logical view of the snapshot. The present system provides flexible, scalable, and cost effective techniques for leveraging cloud storage for off-premises operations on secondary data, such as analytics, development testing, virus scan, load distribution, etc. Objects may be modified (e.g., a unit of storage within a cloud storage environment) without changing the meaning or accessibility of useable data in the objects (e.g., a cloud object comprising a snapshot copy of primary data maintained by the computing device 1102). Objects may be modified to add additional metadata and information such as analytics data, virus scan data, etc. to useable data without modifying the useable data. Thus, an object is maintained as a pseudo read only object because in-use data is unmodifiable while unused or freed data is modifiable such as by a defragmentation and/or garbage collection process.

Changes in objects can be detected in order to resolve what data of the objects is the correct data. The present system provides the ability to perform defragmentation and garbage collection for objects by a cloud service hosted by the object store 1109, such as a cloud storage environment. Defragmentation and garbage collection are provided without affecting access to other in-use data within objects (e.g., in-use snapshot data stored within an object that is used by one or more applications at various remote computers). This allows for more true distributed and infinite scale data management. The present system provides for the ability to run analytics on objects (e.g., read/write analytics of data access to data within an object) using analytic applications hosted within the cloud storage environment. The analytics can be attached to objects even though the objects are read only. The present system provides for deduplication of objects. In this way, objects can be modified while still maintaining consistency of in-use data within the objects (e.g., maintaining consistency of a file system captured by a snapshot that is stored within an object) and without compromising a read only attribute of the objects. Also, computationally expensive processes like garbage collection, analytics, and defragmentation are offloaded from on-premises primary storage systems, such as the computing device 1102, to the object store 1109 such as cloud services within the cloud storage environment.

In one embodiment, objects within the object store 1109 (e.g., objects within a cloud computing environment) can be maintained with a read only attribute such that data within objects can be overwritten/modified/freed so long as in-use data within the objects is not altered. In particular, an object may be maintained within the object store 1109, such as a cloud computing environment. The object comprises a plurality of slots, such as 1024 or any other number of slots. Each slot is used to store a unit of data. The data within each slot is read-only. In particular, the data is read only when in-use, such as where one or more applications are referencing or using the data (e.g., an application hosted by the computing device 1102 is storing data of a snapshot of a local file system within a slot of an object, and thus the snapshot data is in-use until a particular event occurs such as the computing device 1102 deleting the snapshot). In an example, the object comprises snapshot data of a file system, a volume, a logical unit number (LUN), a file, or any other data of the computing device 1102. In this way, the object comprises a read only snapshot of data of the computing device 1102. In one example, a plurality of objects corresponding to read only snapshots of the file system of the computing device 1102 are stored within the object store 1109. Each object is assigned a unique sequence identifier.

A first rule is enforced for the object. The first rule specifies that in-use slots are non-modifiable and unused slots are modifiable. An in-use slot is a slot that stores data actively referenced, used, and/or maintained by a computing device 1102 (a primary storage system). For example, an in-use slot may be a slot that comprises snapshot data (e.g., secondary/replicated data) of a snapshot created by a computing device 1102. The slot becomes an unused slot when the data is no longer actively referenced, used, and/or maintained, such as where the computing device 1102 deletes the snapshot. Thus, if a slot is in-use, then the data within the slot cannot be modified. Otherwise, data in unused slots (e.g., stale data that is no longer referenced or used) can be modified, such as deleted/freed by garbage collection functionality or defragmentation functionality.

Additional information for the object may be generated. The additional information may comprise analytics (e.g., read/write statistics of access to the object), virus scan information, development testing data, and/or a variety of other information that can be generated for the object and the data stored therein. In an example, the additional data is generated by a cloud service or application executing within the cloud computing environment. This will offload processing and resource utilization that would otherwise be used by the computing device 1102 (primary storage system) to perform such analytics and processing.

Metadata of the additional information is attached to an object header of the object. The object header is used to store metadata for each slot of the object. In one example, the metadata specifies a location of the additional information within the object, such as a particular slot into which the additional information is stored. In another example, the metadata may comprise the additional information, and thus the additional information is stored into the object header. The metadata is attached in a manner that does not change a meaning or accessibility of useable data within in-use slots of the object. In particular, applications that are allowed to merely access user data within the object (e.g., the applications are unaware or have no reason to access the additional information) are provided with only access to the user data and are not provided with access to the metadata or additional information. Thus, these applications continue to access user data within the object in a normal manner. For application that are allowed to access both the user data and the additional information, those applications are provided with access to the user data and the metadata for identifying and accessing a location of the additional information within the object. The first rule is enforced such that user data (in-use data) is retained in an unmodified state within the object notwithstanding the metadata and/or additional information being associated with the object.

In an example, a second rule is enforced for the object. The second rule specifies that related read operations are to be directed to a same version of an object. For example, an object corresponds to secondary/replicated snapshot data of a file system maintained by the computing device 1102. Each time a new snapshot of the file system is created, a new version of the object is created to capture changes to the file system. In another example, since in-use data within the object is read only and unmodifiable, any modifications to slots with in-use data will result in a new version of the object being created with the modified data.

If multiple read operations are related, then those read operations should be executed upon the same version of the object for data consistency purposes. This is achieved by comparing timestamp data of the related read operations. If the timestamp data between the related read operations is mismatched, then the related read operations are retried because the related read operations were executed upon different versions of the same object. If the timestamp data between the read operations matches, then the related read operations are considered successful. In an example, a first related read operation reads the object header of the object to identify a slot from which data is to be read. A second related read operation is executed to read data from the slot. The two related read operations should be executed upon the same version of the object/slot (e.g., the operations can be executed upon different versions such as where data of a current version of the object is modified between execution of the operations, thus creating a new version of the object with the modified data since the object is read only and the original data is unmodifiable within the current version of the object). Thus, timestamp data of the two related read operations is used to determine whether the two related read operations were executed upon the same version of the object/slot and thus should be considered complete or should be retried.

In one embodiment, garbage collection is provided for objects within the object store 1109. The objects have a read only state, such that enforcement of the first rule ensures that in-use data within slots of an object is not modifiable, thus making objects pseudo read only objects because only unused slots can be modified/freed of unused data. In an example, an object is used to store data of a snapshot of a file system hosted by the computing device 1102. The snapshot may be determined as being deleted by the computing device 1102, and thus slots comprising snapshot data of the deleted snapshot are now considered to be unused slots as opposed to in-use slots.

Each snapshot of the file system may be associated with a bitmap that identifies objects within the object store that correspond to a particular snapshot. Thus, the bitmaps can be evaluated to identify what objects comprise data of particular snapshots. For example, a bitmap of the deleted snapshot can be used to identify the object and other objects as comprising data of the deleted snapshot.

A garbage collection operation is executed to free objects (e.g. free unused data from unused slots) from the object store in order to reduce storage utilization of the object store that would otherwise be unnecessarily used to store stale/unused data. In an example, the garbage collection operation is executed by a cloud service in order to conserve resource consumption by the computing device 1102 (primary storage system) otherwise used to execute the garbage collection operation. The garbage collection operation free objects from the object store 1109 based upon the objects uniquely corresponding to deleted snapshots. That is, if an object stores data of only deleted snapshots and does not store data of active/undeleted snapshots, then the garbage collection process can free/delete that object. For example, the bitmaps describing objects within the object store 1109 that are related to snapshots of the file system are evaluated to determine whether the object is unique to the deleted snapshot and/or unique to only deleted snapshots (e.g., the object does not comprise data of active/undeleted snapshots). If so, then the object is freed from the object store 1109. However, if the object is not unique to only deleted snapshot(s) such as where the object also stores data of an active/undeleted snapshot, then the object is not freed.

In an embodiment, defragmentation is provided for fragmented objects within the object store 1109. In an example, defragmentation is implemented by a cloud service or application executing in the object store 1109 in order to conserve resources otherwise used by a computing device 1102 (primary storage system) that would execute defragmentation functionality. An object within the object store 1109 is determined to be a fragmented object based upon the object comprising at least one freed slot from which data was freed. For example, a freed slot may comprise an unused slot comprising unused data no longer referenced/used by the computing device 1102 (e.g., data of a deleted snapshot). Accordingly, the fragmented object may comprise one or more in-use slots of in-use data currently referenced/used by a computing device 1102 and one or more freed slots of freed data (e.g., unused slots comprising unused data).

The fragmented object is compacted to retain the in-use data and exclude the freed data (the unused data) as a written object. Because compacting may store the in-use data in new slots, an object header of the object is updated with new locations of the in-use data within the rewritten object. In this way, defragmentation is performed for objects within the object store 1109.

The present system preserves deduplication and compression used by the computing device 1102 for snapshots when storing copied snapshots to the object store 1109 notwithstanding copied snapshots representing fully logical copies of data in the primary storage of the computing device 1102. In particular, deduplication is preserved because data that is shared in a snapshot (e.g., a local or primary snapshot created and maintain by the node) is also shared in a copied snapshot in the object store 1109. Deduplication of compression groups is maintained while logically representing the compression groups in a copied snapshot. Block sharing across multiple snapshots is also preserved so that merely changed blocks are transferred/copied to the object store 1109 during incremental snapshot transfers.

Additional compression may be provided for a snapshot data copy. In particular, larger compression groups provide more space efficiency but with less read efficiency compared to smaller compression groups. Relatively smaller compression groups may be used by the computing device 1102 of the storage system since access to the primary storage of the computing device 1102 may be more read intensive, and thus read efficiency is prioritized over storage space efficiency. Because copied snapshots in the object store 1109 are infrequently accessed (e.g., cold data that is infrequently read), relatively larger compression groups can be employed for improved storage space efficiency within the object store, which also reduces network bandwidth for snapshot copying to the object store 1109.

In one embodiment, snapshots maintained by the computing device 1102 are copied to the object store 1109 as copied snapshots representing logical data of the snapshots. Data of the copied snapshots is stored into slots of objects that are deduplicated with respect to other objects stored within the object store 1109 and retain compression used by the computing device 1102 for the snapshots.

In an example, the computing device 1102 stores data within primary storage. The computing device 1102 may create snapshots of the data stored by the computing device 1102. For example, the computing device 1102 may create a snapshot of a file, a logical unit number, a directory, a volume, a storage virtual machine hosting a plurality of volumes, a file system, a consistency group of any arbitrary grouping of files, directories, or data, etc. The computing device 1102 may deduplicate data between the snapshots so that instead of storing redundant data blocks multiple times, merely references are stored in place of the redundant data blocks and point to original data blocks with the same data.

The computing device 1102 may compress data within the snapshots, such as by creating compression groups of compressed data blocks.

The mapping metafile and/or the overflow mapping metafile is used to determine what data of the current snapshot is to be copied to the object store 1109 and what data already exists within the object store so that only data not already within the object store is transmitted to the object store 1109 for storage within an object. Upon determining that the current snapshot is to be copied to the object store, an invalidation phase is performed. In particular, a list of deallocated block numbers of primary storage of the computing device 1102 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

Figure 12:
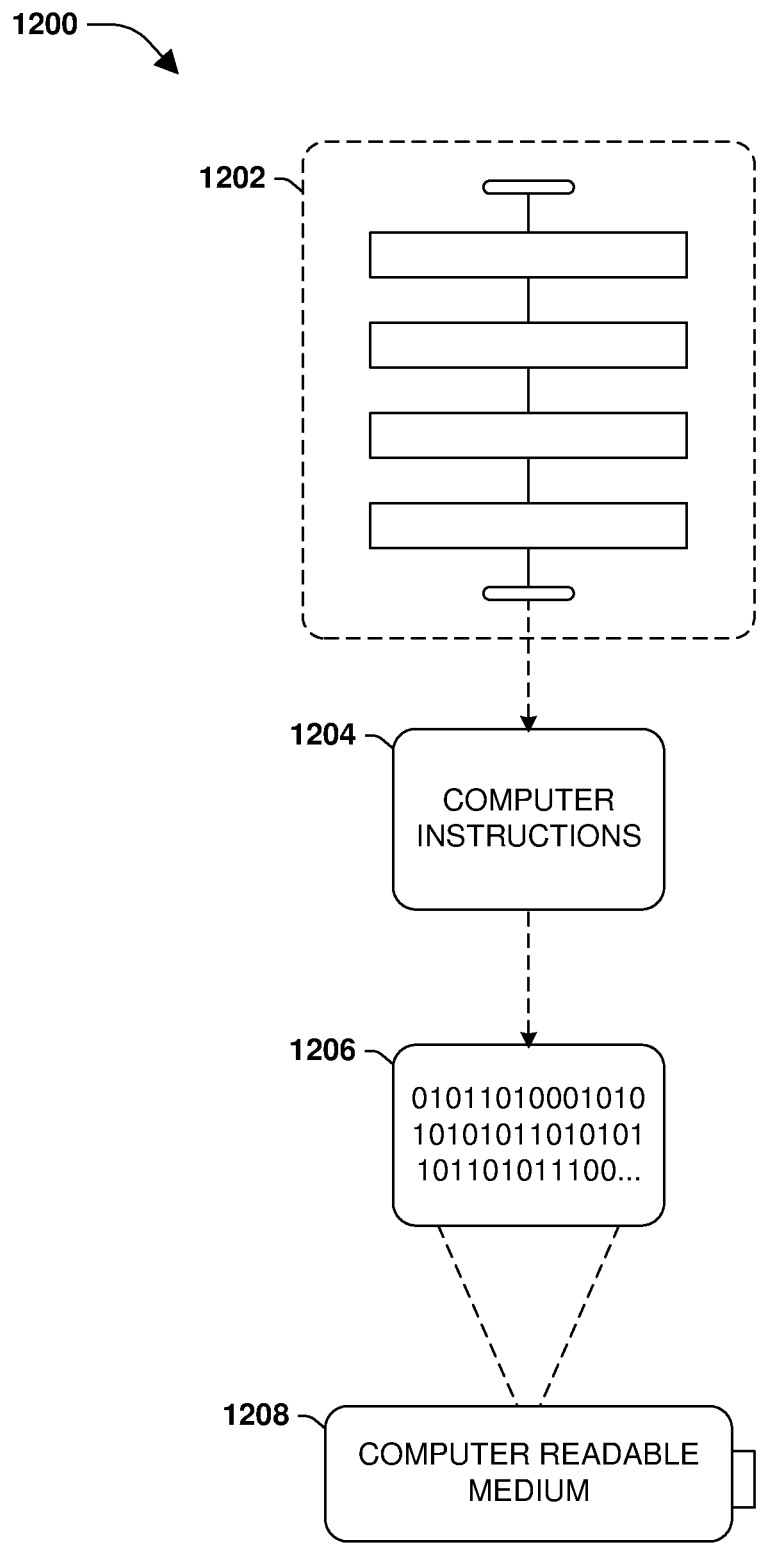
FIG. 12 is an example of a computer readable medium in which an embodiment of the invention may be implemented.

Still another embodiment involves a computer-readable medium 1200 comprising processor-executable instructions configured to implement one or more of the techniques presented herein. An example embodiment of a computer-readable medium or a computer-readable device that is devised in these ways is illustrated in FIG. 12, wherein the implementation comprises a computer-readable medium 1208, such as a compact disc-recordable (CD-R), a digital versatile disc-recordable (DVD-R), flash drive, a platter of a hard disk drive, etc., on which is encoded computer-readable data 1206. This computer-readable data 1206, such as binary data comprising at least one of a zero or a one, in turn comprises processor-executable computer instructions 1204 configured to operate according to one or more of the principles set forth herein. In some embodiments, the processor-executable computer instructions 1204 are configured to perform a method 1202, such as at least some of the exemplary method 400 of FIG. 4, for example. In some embodiments, the processor-executable computer instructions 1204 are configured to implement a system, such as at least some of the exemplary system 500 of FIGS. 5A-5E, and/or at least some of the exemplary system 600 of FIG. 6, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   in response to receiving a restore request to restore backup data of a snapshot stored within slots of one or more objects in a remote object store, creating an on-demand volume within local storage of a device;
   copying metadata from the snapshot in the remote object store to the local storage, wherein the metadata comprises cloud block numbers identifying blocks comprising the backup data, wherein a cloud block number of a block comprises a sequence number of an object and a slot number of a slot within the object in which backup data of the block is stored;
   in response to the metadata being copied, providing a client with access to the on-demand volume during a restore process that copies the backup data from the snapshot within the remote object store to the on-demand volume, comprising:
      in response to receiving a request from the client through the on-demand volume for the block, on-demand retrieving from the snapshot and caching the block for client access based upon the metadata mapping the cloud block number of the block to an absent indicator indicating that the block has not yet been restored; and
   implementing the restore process to copy the backup data from the snapshot within the remote object store to the on-demand volume using the cloud block numbers to identify and retrieve the backup data from the one or more objects within the remote object store.

2. The method of claim 1, wherein the copying metadata comprises:
   initializing the metadata with the cloud block numbers mapped to absent indicators indicating that the blocks have not yet been restored from the snapshot in the object store to the local storage of the device.

3. The method of claim 1, wherein the restore process uses the sequence number of the cloud block number to identify the object and uses the slot number of the cloud block number to identify and retrieve the backup data of the block from the object for restoring the backup data of the block into the on-demand volume.

4. The method of claim 1, comprising:
   in response to the metadata indicating that the block has been restored to the on-demand volume based upon the metadata mapping a virtual volume block number for the block to a physical volume block number for the block, retrieving the block from the local storage for client access.

5. The method of claim 1, wherein the providing the client with access to the on-demand volume comprises:
   in response to the metadata indicating that the block has been restored to the on-demand volume, retrieving the block from the local storage; and
   providing the block to the client in response to the request.

6. The method of claim 5, comprising:
   determining that the block has been restored based upon the metadata comprising a virtual volume block number for the block.

7. The method of claim 6, wherein the virtual volume block number is mapped to a physical volume block number used to retrieve the block from the local storage.

8. The method of claim 1, comprising:
   in response to the restore process completing, converting the on-demand volume to a volume exposed to clients for read and write access of data through the volume.

9. The method of claim 1, comprising:
   in response to the restore process restoring the blocks as restored blocks within the local storage, overwriting cloud block numbers within the metadata for the blocks with virtual volume block numbers for the restored blocks and overwriting absent indicators within the metadata for the blocks with physical volume block numbers for the restored blocks.

10. The method of claim 1, comprising:
    in response to on-demand retrieving and caching the block as a cached block, retaining the cloud block number within the metadata for the block and replacing the absent indicator within the metadata for the block with a physical volume block number of the cached block.

11. The method of claim 1, comprising:
    in response to the restore process restoring a block from the snapshot to the on-demand volume, replacing a cloud block number of the block with a virtual volume block number for the block.

12. The method of claim 11, comprising:
replacing an absent indicator mapped to the cloud block number with a physical volume block number mapped to the virtual volume block number.

13. A computing device comprising:
a memory comprising machine executable code; and
a processor coupled to the memory, the processor configured to execute the machine executable code to cause the processor to:
  perform a backup operation to back up a volume stored within local storage to a remote object store as backup data within a snapshot;
  create an on-demand volume within the local storage in response to a restore request to restore the volume using the snapshot;
  copy metadata from the snapshot to the local storage, wherein the metadata identifies blocks comprising the backup data, and wherein the metadata is initialized with absent indicators for the blocks to indicate that the blocks have yet to be restored by a restore process; and
  in response to the metadata being copied, provide a client with access to the on-demand volume during the restore process that copies the from the snapshot within the remote object store to the on-demand volume, wherein the absent indicators are replaced with physical volume block numbers as the blocks are restored.

14. The computing device of claim 13, wherein the machine executable code causes the processor to:
  populate the metadata with virtual volume block number entries mapped to physical volume block number entries.

15. The computing device of claim 14, wherein a virtual volume block number entry is populated with a cloud block number and a corresponding physical volume block number entry is populated with an absent indicator for a block not yet restored from the snapshot.

16. The computing device of claim 14, wherein a virtual volume block number entry is populated with a virtual volume block number and a corresponding physical volume block number entry is populated with a physical volume block number for a block restored from the snapshot to the on-demand volume.

17. The computing device of claim 13, wherein the machine executable code causes the processor to:
  in response to receiving a request for a block from the client and the metadata indicating that the block has not yet been restored to the on-demand volume, retrieve the block from the snapshot in the remote object store to provide to the client in response to the request.

18. The computing device of claim 13, wherein the machine executable code causes the processor to:
  in response to receiving a request for a block from the client and the metadata indicating that the block has been restored to the on-demand volume, retrieve the block from the local storage to provide to the client in response to the request.

19. A non-transitory machine readable medium comprising instructions for performing a method, which when executed by a machine, causes the machine to:
  perform a backup operation to back up a volume stored within local storage to a remote object store as backup data within a snapshot;
  create an on-demand volume within local storage;
  copy metadata from the snapshot to the local storage, wherein the metadata identifies blocks comprising backup data of the volume stored within the snapshot; and
  in response to the metadata being copied, provide a client with access to the on-demand volume, comprising:
    in response to receiving a request from the client through the on-demand volume for data, identify a set of blocks comprising the data;
    in response to the metadata indicating that a first subset of blocks of the set of blocks have not yet been restored to the on-demand volume based upon the metadata comprising absent indicators for the first subset of blocks, on-demand retrieve from the snapshot and cache the first subset of blocks for the request; and
    in response to the metadata indicating that a second subset of blocks of the set of blocks have been restored to the on-demand volume based upon the metadata comprising virtual volume block numbers for the second subset of blocks, retrieve the second subset of blocks from the local storage for the request.

20. The non-transitory machine readable medium of claim 19, wherein the instructions cause the machine to:
  in response to on-demand retrieving and caching the first subset of blocks as cached blocks, retain cloud block numbers within the metadata for the first subset of blocks and replace the absent indicators within the metadata for the first subset of blocks with physical volume block numbers of the cached blocks.

* * * * *